United States Patent [19]
Shimamura

[11] Patent Number: 5,926,180
[45] Date of Patent: Jul. 20, 1999

[54] BROWSING UNIT AND STORAGE MEDIUM RECORDING A BROWSING PROGRAM THEREON

[75] Inventor: Hisashi Shimamura, Tokyo, Japan

[73] Assignee: NEC Corporation, Tokyo, Japan

[21] Appl. No.: 08/783,078

[22] Filed: Jan. 15, 1997

[30] Foreign Application Priority Data

Jan. 16, 1996 [JP] Japan .................................... 8-023318

[51] Int. Cl.$^6$ ...................................................... G06F 3/00
[52] U.S. Cl. ...................................... 345/357; 395/200.33
[58] Field of Search .................................. 345/329, 330, 345/333, 334, 335, 356, 357, 133, 440; 395/200.3, 200.33, 200.47, 200.31

[56] References Cited

U.S. PATENT DOCUMENTS

| | | | |
|---|---|---|---|
| 5,159,669 | 10/1992 | Trigg et al. | 345/357 |
| 5,546,517 | 8/1996 | Marks et al. | 707/501 |
| 5,572,643 | 11/1996 | Judson | 395/200.48 |
| 5,634,062 | 5/1997 | Shimizu et al. | 707/501 |
| 5,717,860 | 2/1998 | Graber et al. | 395/200.57 |

FOREIGN PATENT DOCUMENTS 4-321144   11/1992   Japan .
9-146962   6/1997   Japan .

OTHER PUBLICATIONS

Howlett, D., "Easier Web Analysis," PC User, n. 286, p58(1), Jun. 1996.

Doemel, "WebMap: A Graphical Hypertext Navigation Tool", *Computer Networks and ISDN Systems,* vol. 28:85–97, (1995).

*Primary Examiner*—A. Katbab
*Attorney, Agent, or Firm*—Foley & Lardner

[57] ABSTRACT

A browsing unit according to the present invention comprises an input means for receiving request for a node from a user, an information obtaining means for obtaining the requested node from a server, content information output means for outputting the content information of the obtained node, a related information extracting means for extracting structural information from the content information of the received node, a historical information storing means for storing the structural information obtained by the related information extracting means, and a structure display means for displaying to the user in the form of a map the structural information stored by the historical information storing means.

18 Claims, 18 Drawing Sheets

BROWSING UNIT AND STORAGE MEDIUM RECORDING A BROWSING PROGRAM THEREON

BACKGROUND OF THE INVENTION

1. Field of the Invention

The present invention relates to a browsing unit in a distributed hyper media system, and more particularly, to a browsing unit which allows efficient navigation.

2. Description of the Prior Art

Normally, a distributed hyper media system comprises a plurality of servers for distributed management of data comprising nodes and links on a network and a client computer for obtaining necessary data by accessing the servers on demand of a user. As the client, a unit which receives a request for obtaining data from a user, obtains a node from an appropriate server, and displays the content information of the node is referred to as a browsing unit.

Each of the nodes has a link to a node related thereto. With such a browsing unit, a user can obtain a related node by following the link. Related nodes can be obtained one after another by following links. This operation is referred to as navigation.

As a distributed hyper media system of this kind, the WWW (World Wide Web) is widely used. When access to the WWW is made, a browsing unit such as "Mosaic" or "Netscape" is used to obtain content information of a node. An example of a conventional browsing unit is disclosed in an article entitled "WebMap: a graphical hypertext navigation tool" by Peter Dömel, published in the Computer Networks and ISDN Systems, on pages 85–97, issued in 1995 by Elsevier Science, B. V.

FIG. 20 is a block diagram for describing a conventional browsing unit used for the WWW. This conventional browsing unit 800 comprises an input means 801 for receiving an input from a user such as a navigation operation, a content information output means 802 for outputting content information of a node obtained by a server, an information obtaining means 803 for obtaining content information of a node from a server, and a historical information storing means 810 for managing information about obtaining of a node in the past.

In the operation of the browsing unit, data requested from the input means 801 is obtained from a server computer by the information obtaining means 803. The content information output means 802 displays the content information of the node obtained by the information obtaining means 803. At the same time, the information obtaining means 803 records, as historical information, an identifier representing the location of the data the obtaining of which was requested and the date and time of the last access to the data.

However, since the conventional distributed hyper media system does not retain the overall structure of the nodes and links under distributed management, there is a problem that the browsing unit can not capture the macro structure comprising nodes and links on the distributed hyper media space. For example, though a user can tell a node linked directly to the node being viewed now, he (or she) can not tell a node linked to the node linked directly to the node being viewed now, and nor can he (or she) tell connected nodes from the macro viewpoint. Since a user can not see far ahead of the linked node, he (or she) is forced to conduct a wasteful operation to check the content information of the linked node by actually following links one by one on the browser.

Further, though the conventional browsing unit can tell whether the node is one which it accessed in the past, it can not tell whether the node is frequently used or seldom used.

In addition, since the historical information is not displayed graphically, it is difficult to tell how frequently a node following a certain link was accessed in the past. Therefore, though navigation is made in search of new information, it tends to be inefficient navigation in which, for example, a node frequently used is accessed many times.

SUMMARY OF THE INVENTION

An object of the present invention is therefore to provide a browsing unit which does not have the above-mentioned conventional disadvantages, and which, by graphically displaying both structural information of a hyper media space and a history of access by a user, reduces the difficulty to see far ahead in navigation and makes the state of access by the user himself in the past to be easily understood, and thus, allows quick access to necessary information.

According to an aspect of the present invention, there is provided a browsing unit used in a distributed hyper media system including a server computer for managing a node, which is a unit of data, and a link representing the relationship between nodes and a client computer for obtaining and displaying information comprising the node and the link. The browsing unit comprises: input means for receiving a request from a user; information obtaining means for obtaining the node via a network from the server; content information output means for outputting the content information of the node to the user; related information extracting means for extracting link information from the node as structural information; historical information storing means for storing and managing the structural information extracted by the related information extracting means; and structure display means for displaying the structural information stored by the historical information storing means.

According to another aspect of the invention, there is proviede a storage medium recording thereon a program for enabling a client computer to execute: information obtaining process for obtaining a node via a network from a server computer managing the node as a unit of data and a link which represents the relationship between nodes; content information output process for outputting the content of the node to the user as structural information; related information extracting process for extracting link information from the node as structural information; historical information storing process for storing and managing the structural information extracted by the related information extracting process; and structure display process for displaying the structural information stored by the historical information storing process.

BRIEF DESCRIPTION OF THE DRAWINGS

Other features and advantages will be apparent from the following detailed description when taken in conjunction with the accompanying drawings, in which.

In the figures, the same reference numerals represent the same structural elements.

DETAILED DESCRIPTION OF THE PREFERRED EMBODIMENTS

Figure 1:
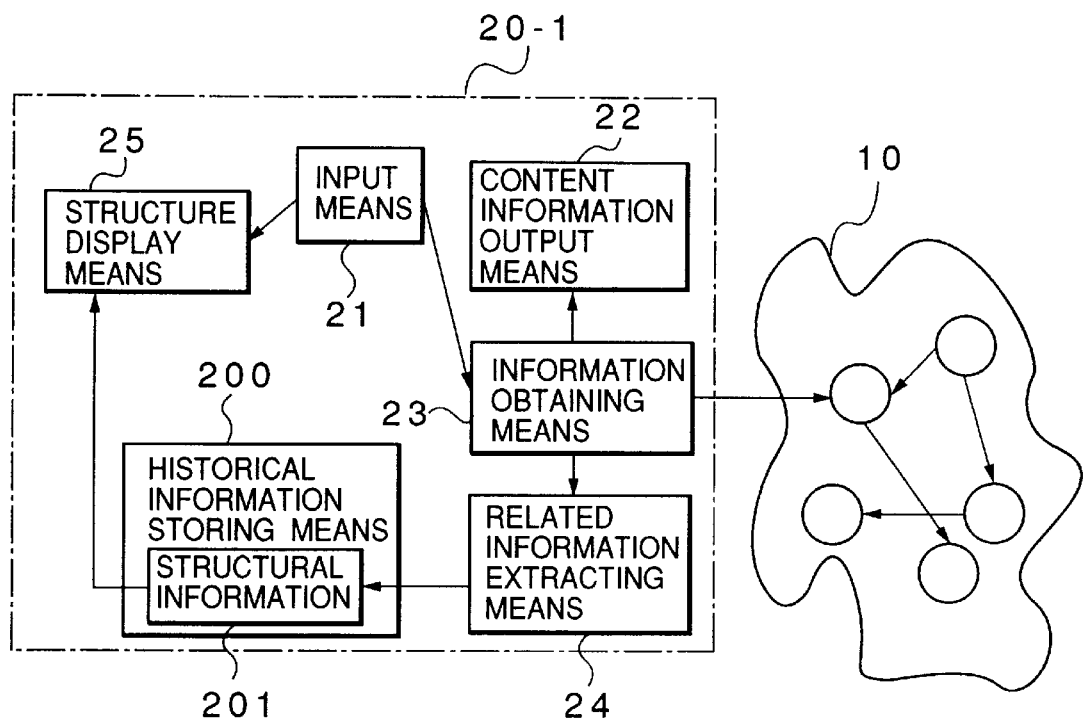
FIG. 1 is a block diagram of a first embodiment of the present invention.

Next, the present invention is described in detail with reference to the drawings. First, a first embodiment of the present invention is described with reference to FIGS. 1, 2, and 3. FIG. 1 is a block diagram of the first embodiment of the present invention. In FIG. 1, a hyper media space 10 comprises nodes and links under distributed management by a plurality of server computers.

A client computer 20-1 operates as a browsing unit under the control of a browsing program. In other words, the browsing program controls the operation of the client computer 20-1, and enables the client computer 20-1 to function as an input means 21 for receiving an input such as a request for obtaining a node from a user, a content information output means 22 for outputting the content information of the obtained node, an information obtaining means 23 for obtaining a node from a server, a related information extracting means 24 for extracting related structure of a node, a historical information storing means 200 for storing structural information 201, and a structure display means 25 for displaying the structural information to the user.

Figure 2:
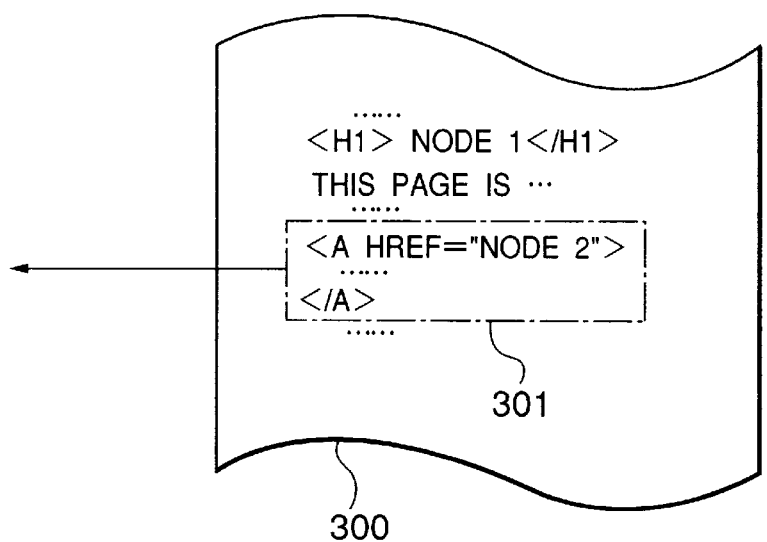
FIG. 2 shows an example of extracting structural information from content information of a node.

FIG. 2 shows an example of extracting link information from content information of a node. In content information 300 of an obtained node, other than text and control codes such as for font designation, a control code representing a link to another node is included. In this example, the portion sandwiched between <A HREF= . . . > and </A> is an anchor point of a link to another node, which represents that related information can be obtained from the text, picture, etc. written in the sandwiched portion. The first portion <A HREF= . . . > represents the identifier of a linked node, and in this example, a link extends to "Node 2".

Figure 3:
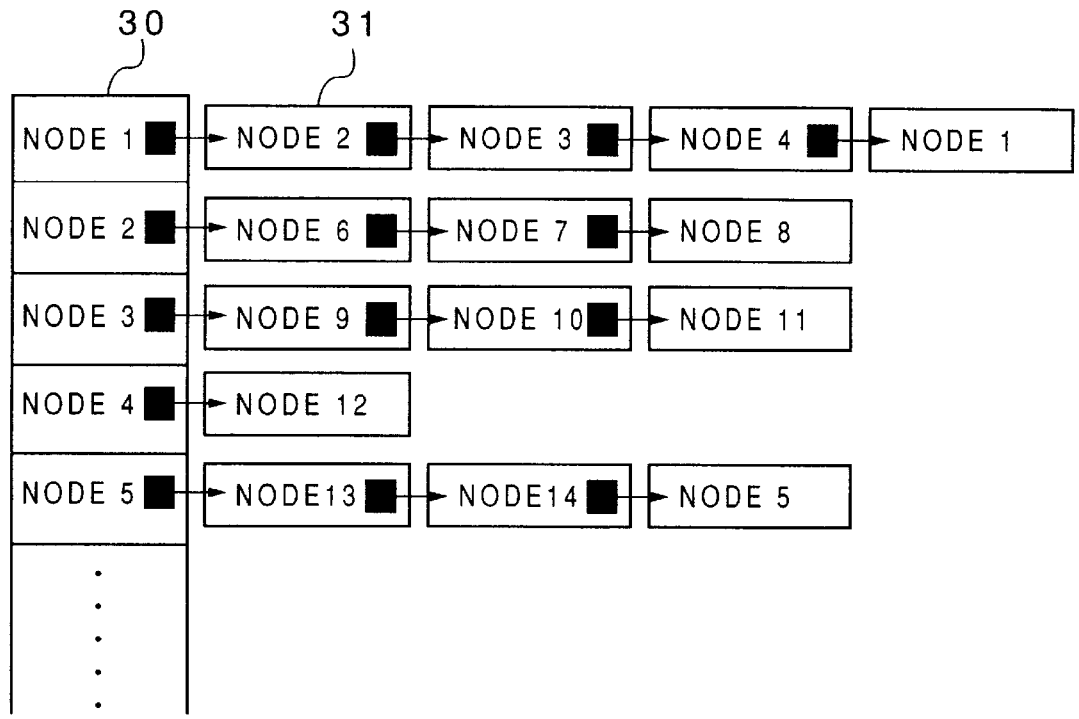
FIG. 3 shows historical information used in the first embodiment.

FIG. 3 is an example of the structure of the structural information 201. It has identifiers of nodes obtained up to now in an array 30. Nodes linked to the respective nodes are tied to the respective elements of the array in a list 31. Since Node 1 is linked to Nodes 2, 3, 4, and 5, these four linked nodes are listed and tied to Node 1.

Here, the operation of the present embodiment is described. First, the structural display means 25 takes out the structural information 201 recorded by the historical information storing means 200 when access was made in the past and displays to the user the structure of the relationship of the nodes and the links in the form of a map. The user designates a node to be obtained by directly inputting the identifier of the node as text or by inputting with a pointing device such as a mouse on the displayed map. Whether the input from the user is text input or input on the map, the input is managed by the input means 21.

The information obtaining means 23 receives from the input means 21 the identifier of the node to be obtained. The identifier describes which server computer manages the node. The information obtaining means 23 obtains the required node from the server computer described in the identifier.

The content information output means 22 displays to the user the content information of the node passed from the information obtaining means 23 according to the type of the media. Here, displaying, animating, sound reproducing, and so on of text data and graphic data included in the content information are conducted.

The related information extracting means 24 extracts the link information which was passed from the information obtaining means 23 and which represents the relationship between the node and another node. The historical information storing means 200 updates the structural information 201.

FIG. 2 shows that link information 301 to Node 2 is included in the content information 300 of the obtained Node 1. This becomes the structural information 201 and is stored in the historical information storing means 200. Here, as shown in FIG. 3, for example, if Node 2 (31) is not in the list of the linked nodes in the entry (30) of Node 1 in the list of the original nodes, insertion is conducted.

The structure display means 25 displays to the user the relationship of the nodes and the links in the form of a map based on the updated structural information 201 from the historical information storing means 200.

According to the present embodiment, a macro structure of a distributed hyper media space, which was conventionally difficult to understand because of the distributed management thereof, can be displayed to a user. While it costs much to collect in advance from many servers structural information of a hyper media space possessed by the servers, according to the present embodiment, by extracting structural information as a history from content information of a node obtained by the user himself (or herself), a macro structure can be obtained at a very low cost.

Figure 4:
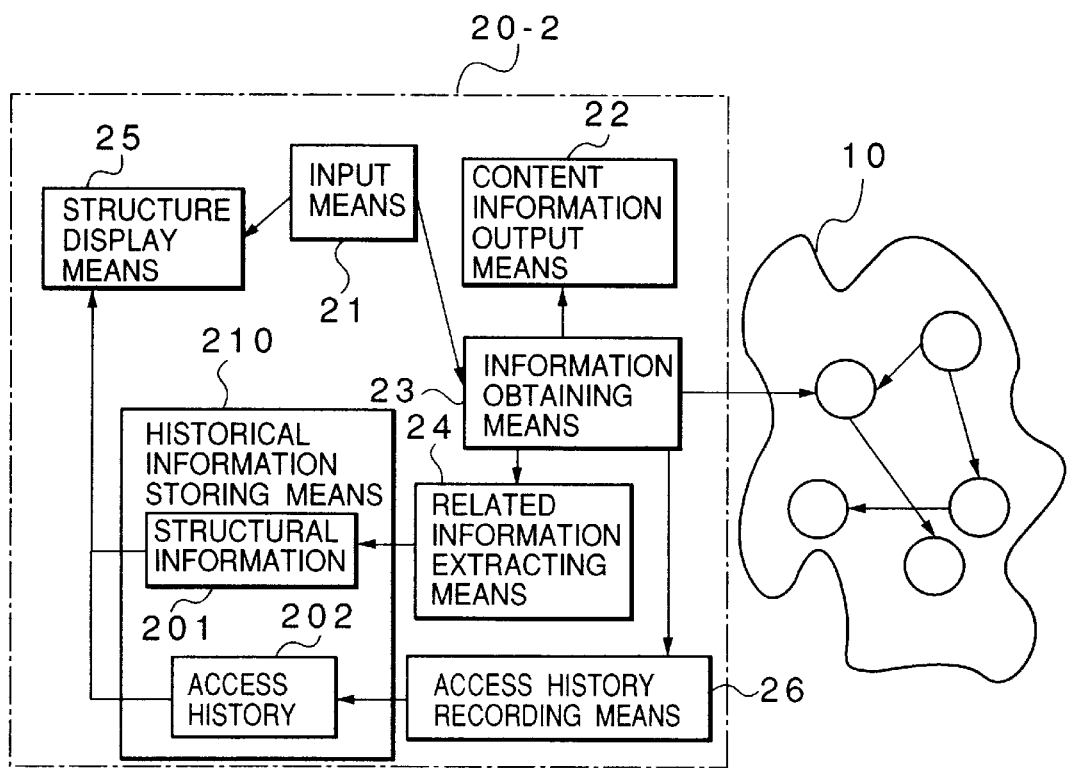
FIG. 4 is a block diagram of a second embodiment of the present invention.

Next, a second embodiment of the present invention is described with reference to FIGS. 4, 5, and 2. FIG. 4 is a block diagram of the second embodiment. In the figure, a browsing unit 20-2 comprises the input means 21 for receiving an input such as a request for obtaining a node from a user, the content information output means 22 for outputting the content information of the obtained node, the information obtaining means 23 for obtaining a node from a server, the related information extracting means 24 for extracting related structure of nodes, an access history recording means 26 for recording an access history, a historical information storing means 210 for storing the structural information 201 and an access history 202, and the structure display means 25 for displaying the historical information to the user.

Figure 5:
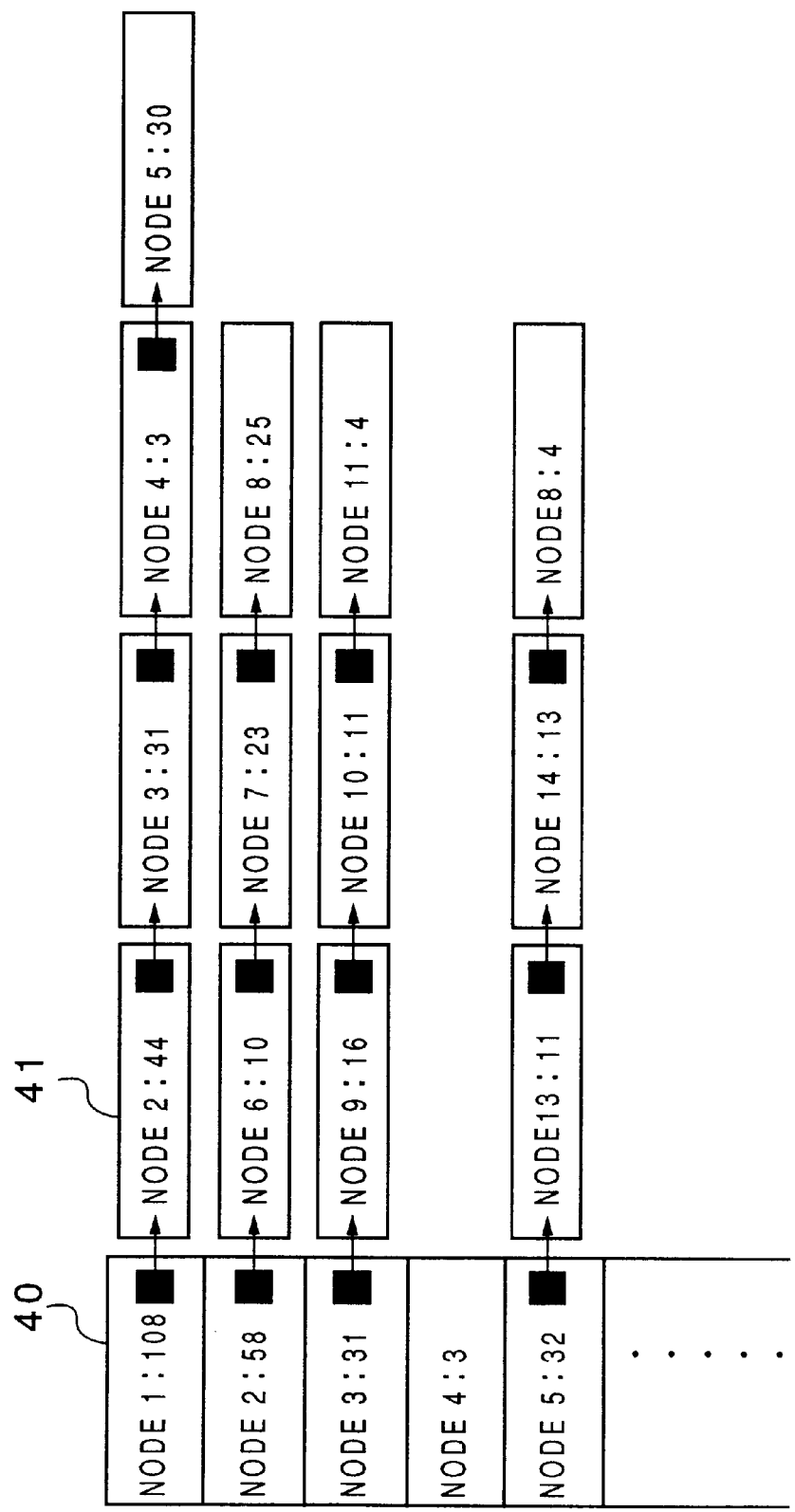
FIG. 5 shows historical information used in the second embodiment.

FIG. 5 shows an example of the structure of the historical information. Here, a region for storing the frequency of access is assigned to the structural information of the first embodiment. An array 40 of identifiers of nodes stores information about the frequency of access to the nodes, and it can be seen that Node 1 was accessed 108 times. A list 41 representing nodes linked to the respective original nodes records how many times the links were followed, and it can be seen that the link from Node 1 to Node 4 was followed three times.

Next, the operation of the second embodiment is described. First, the structural display means 25 takes out the structural information 201 and the access history 202 recorded by the historical information storing means 210 when access was made in the past, and displays to the user the structure of the relationship of the nodes and the links in the form of a map with the frequency of access reflected.

The user designates a node to be obtained by directly inputting the identifier of the node as text or by inputting with a pointing device such as a mouse on the map. Whether the input from the user is text input or input on the map, the input is managed by the input means 21.

The information obtaining means 23 receives from the input means 21 the identifier of the node to be obtained. The identifier describes which server computer manages the node. The information obtaining means 23 obtains the required node from the server computer described in the identifier.

The content information output means 22 displays to the user the content information of the node passed from the information obtaining means 23 according to the type of the media. Here, displaying, animating, sound reproducing, and so on of text data and graphic data included in the content information are conducted.

The related information extracting means 24 extracts as the structural information 201 the link information which was passed from the information obtaining means 23 and which represents the relationship between the node and another node. The access history recording means 26 records the number of access over a predetermined period as the frequency of access to the obtained node from the identifier of the obtained node passed from the information obtaining means 23. The frequency information is made to be the access history 202, and the historical information storing means 210 updates the structural information 201 and the access history 202.

In FIG. 2, the link information 301 to Node 2 is included in the content information 300 of the obtained Node 1. This becomes the structural information 201 and is stored in the historical information storing means 210. And, as shown in FIG. 5, for example, the frequency of access in the entry 40 of Node 1 in the list of the original nodes is increased to 108, and if there is no entry of Node 2 (41) of the list of the linked nodes, insertion is conducted.

If the link to Node 2 is followed with Node 1 displayed with the browsing unit, the frequency of access to Node 2 (41) connected with the list of the nodes linked to Node 1 (40) in the list of the original nodes is increased, and at the same time, the frequency of access to Node 2 (42) in the list of the original nodes is increased.

The structure display means 25 displays to the user the structure of the relationship of the nodes and the links with the frequency of access reflected, based on the updated structural information 201 and access history 202 read out from the historical information storing means 210.

According to the second embodiment, information about the frequency of access, time spent in reading, and so on is recorded as the history of access by the user, while conventionally, only the date and time of the last access are taken into consideration. Thus, information which can be displayed to the user is increased, navigation with the access in the past by the user himself (or herself) as the key is allowed, and wasteful operation can be reduced.

Figure 6:
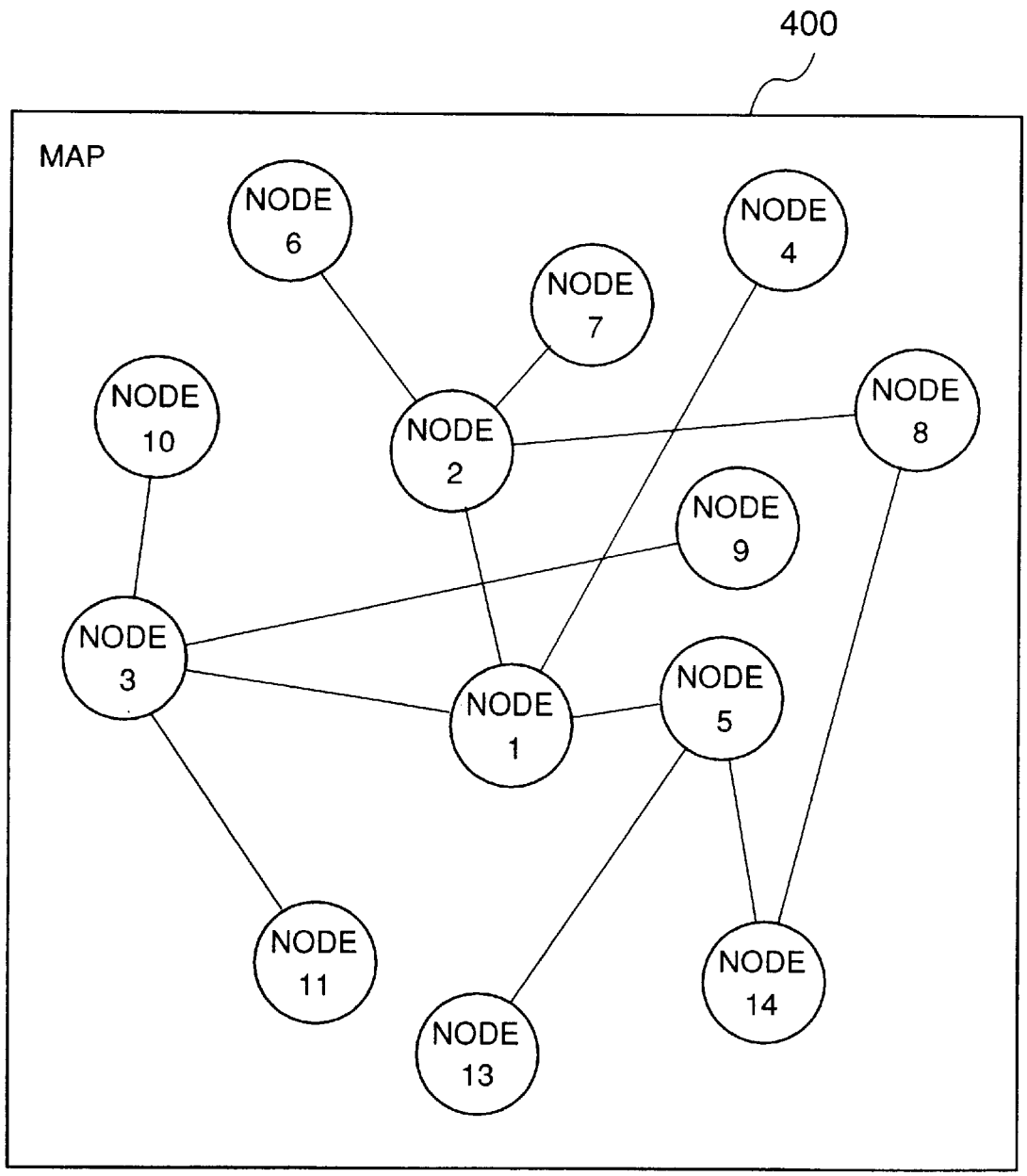
FIG. 6 shows an example of displaying structural information used in a third embodiment.

Next, a third embodiment is described with reference to FIGS. 6, 7, and 3. The structure of a browsing unit according to the third embodiment is the same as that shown in FIG. 1. FIG. 6 shows an example of a map generated by the structure display means 25 according to the third embodiment. Here, a node is represented as a circle, a link is represented as a line, and a map is displayed as a graph with nodes related through a link being connected by the link.

Figure 7:
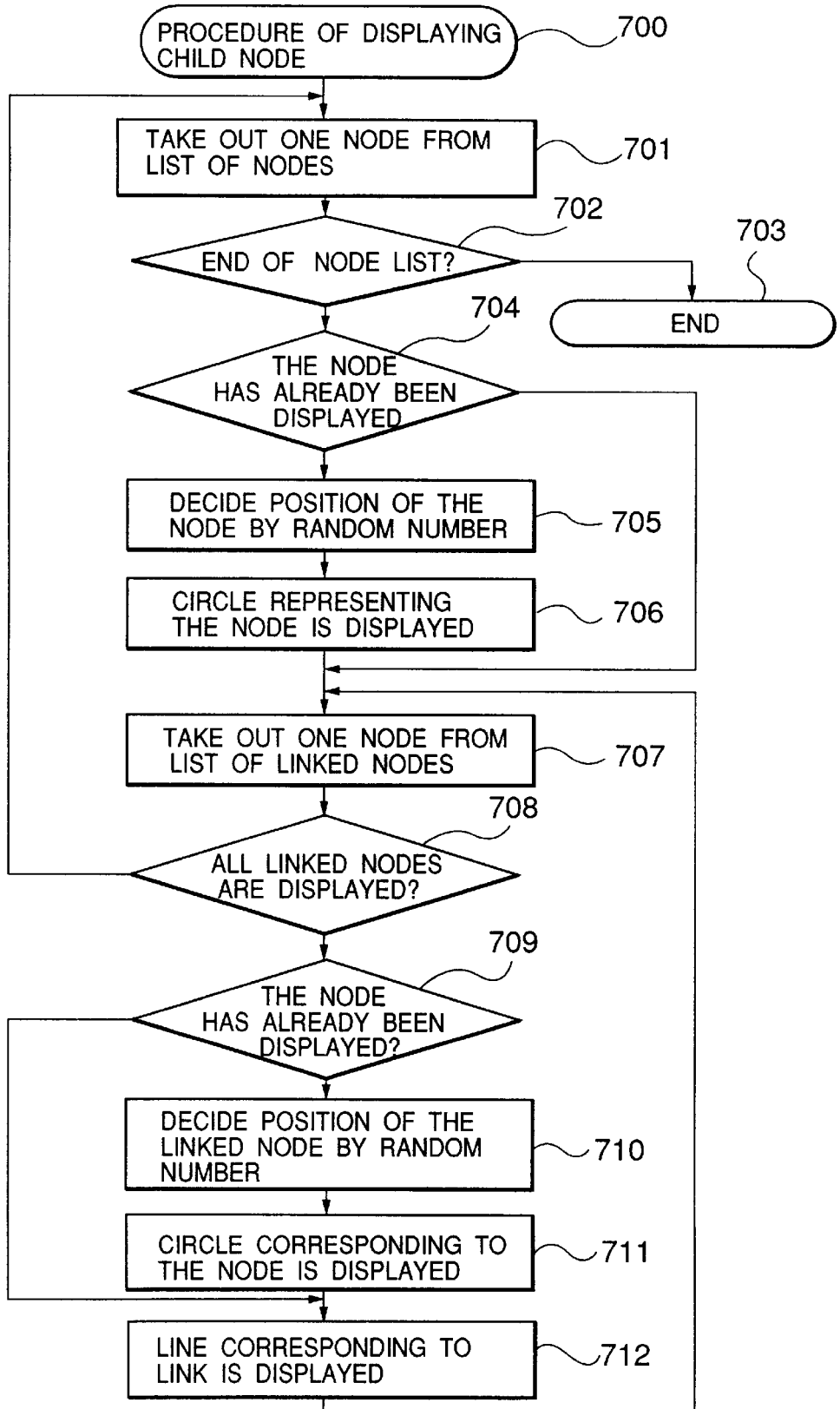
FIG. 7 is a flow diagram showing an example of procedure of displaying the structural information used in the third embodiment.

FIG. 7 is a flow diagram showing algorithm of procedure of drawing a map by the structure display means 25 in the third embodiment.

The structure display means 25 calls procedure of drawing a map (step 700). Then, an identifier of a node is taken out in order of the list of nodes stored as the structural information 201 (step 701). If this is the end of the list (step 702), the procedure ends (step 703).

If this is not the end of the list, it is ascertained whether the node of the node identifier taken out from the list has already been displayed (step 704). If the node has already been displayed, the process for displaying the node (steps 705 and 706) is skipped and a linked node is drawn. If the node has not yet been displayed, its display position on the map is decided by a random number so that nodes are equally spaced on the map (step 705), and a circle representing the node is displayed (step 706).

Next, a node linked to the node taken out at step 701 is drawn. The list of nodes linked to the node taken out at step 701 is taken out from the structural information 201, and an identifier of a linked node is taken out in order of the list (step 707). Then, it is ascertained whether it is the end of the list (step 708), and if it is the end of the list, it follows that drawing is finished relating to the node taken out in step 701, and the routine goes back to step 701 to conduct procedure of drawing the node of the next node identifier in the list of nodes and drawing links thereto.

If it is not the end of the list, it is checked whether the node of the linked node identifier taken out has already been displayed (step 709). If the node has already been displayed, the process for displaying the linked node (steps 710 and 711) is skipped. If the node has not yet been displayed, similarly to the case of steps 705 and 706, the position of the linked node is decided by a random number (step 710), and a circle representing the node is displayed (step 711).

A line representing a link is displayed between the node taken out at step 701 and the linked node (step 712), and drawing of the linked node taken out at step 707 ends. Then, the routine repeats to draw the next linked node. In this way, all of the nodes and the links are displayed on the map.

Procedure of displaying the map shown in FIG. 6 based on the data shown in FIG. 3 is now described according to the above-mentioned algorithm. First, Node 1 at the head of the list of the original nodes is taken out (step 701). Since Node 1 has not yet been displayed (step 704), its display position is decided by a random number (step 705) and a circle representing Node 1 is drawn at the position (step 706). In order to draw a node in the list of the linked nodes of the entry of Node 1 in the list of the original nodes, Node 2 is taken out from the head of the list of the linked nodes (step 707). Since Node 2 has not yet been displayed (step 709), its display position is decided by a random number (step 710), and a circle representing Node 2 is drawn (step 711).

A line representing a link is drawn between Node 1 and Node 2 (step 712), and similarly, drawing process is conducted with respect to other nodes linked to Node 1 (the routine goes back to step 707 and repeats). After drawing of nodes linked to Node 1 is finished, drawing process is conducted with respect to Node 2, which is the next entry in the list of the original nodes, and nodes linked thereto. In this way, all of the nodes and the links up to nodes linked to Node 5 are drawn to obtain the output shown in FIG. 6.

According to the third embodiment, the structure of the nodes and the links is easy to understand by displaying structural information as a simple graph.

Figure 8:
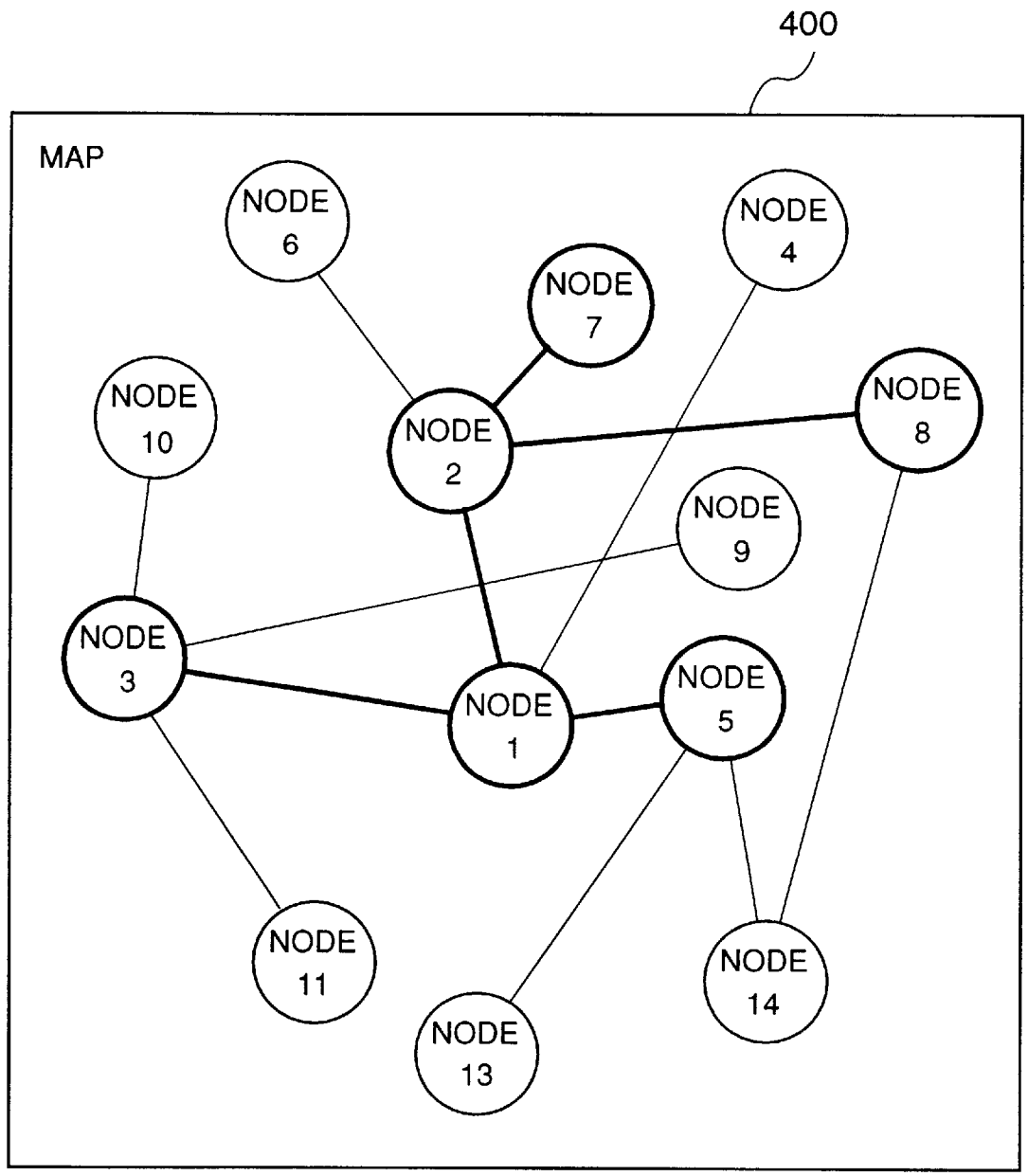
FIG. 8 shows an example of displaying structural information used in a fourth embodiment.

Next, a fourth embodiment according to the present invention is described with reference to FIGS. 8, 7, and 5. The structure of the fourth embodiment is the same as that shown in FIG. 4. FIG. 8 shows an example of a map generated by the structure display means 25 according to the fourth embodiment. According to this embodiment, a map similar to that according to the third embodiment is displayed, but this embodiment is characterized in that, based on the access history 202 recorded by the access history recording means 26 according to the second embodiment, the way of displaying is changed depending on the frequency of access to the respective nodes and links.

Here, it is represented that the thicker the drawn line is, the higher the frequency of access is. What represents the difference of the frequency of access is not limited to the thickness of lines, and, for example, the difference in the frequency of access may be represented by difference in color.

The procedure of drawing a map by the structure display means 25 according to the fourth embodiment is similar to that according to the third embodiment shown in FIG. 7, except that the frequency of access to the nodes and the links to be drawn in the portion of displaying the links and the nodes (steps 706, 711, and 712) is obtained from the access historical information 202, and, as mentioned in the above, the way of displaying is changed so that, if the frequency of access to a node or a link is less than ten times, from ten to twenty times, from twenty to forty times, and forty times or more, the thickness of a line used in drawing the node or the link is "1", "2", "3", and "4", respectively.

FIG. 8 reflects the values of the frequency of access in FIG. 5. For example, Node 2 (463), the frequency of access to which is 58 times, and a link (454) from Node 1 to Node 2, the frequency of access to which is 44 times, are drawn with the line which is "4" thick (a thick line). On the other hand, Node 4 (451), the frequency of access to which is three times, and a link (452) from Node 1 to Node 4, the frequency of access to which is three times, are drawn with the line which is "1" thick (a thin line).

According to the fourth embodiment, by highlighting the nodes and links depending on the frequency of access thereto on a map of a graph structure, the structure and the access history can be displayed so as to be easily understood.

Figure 9:
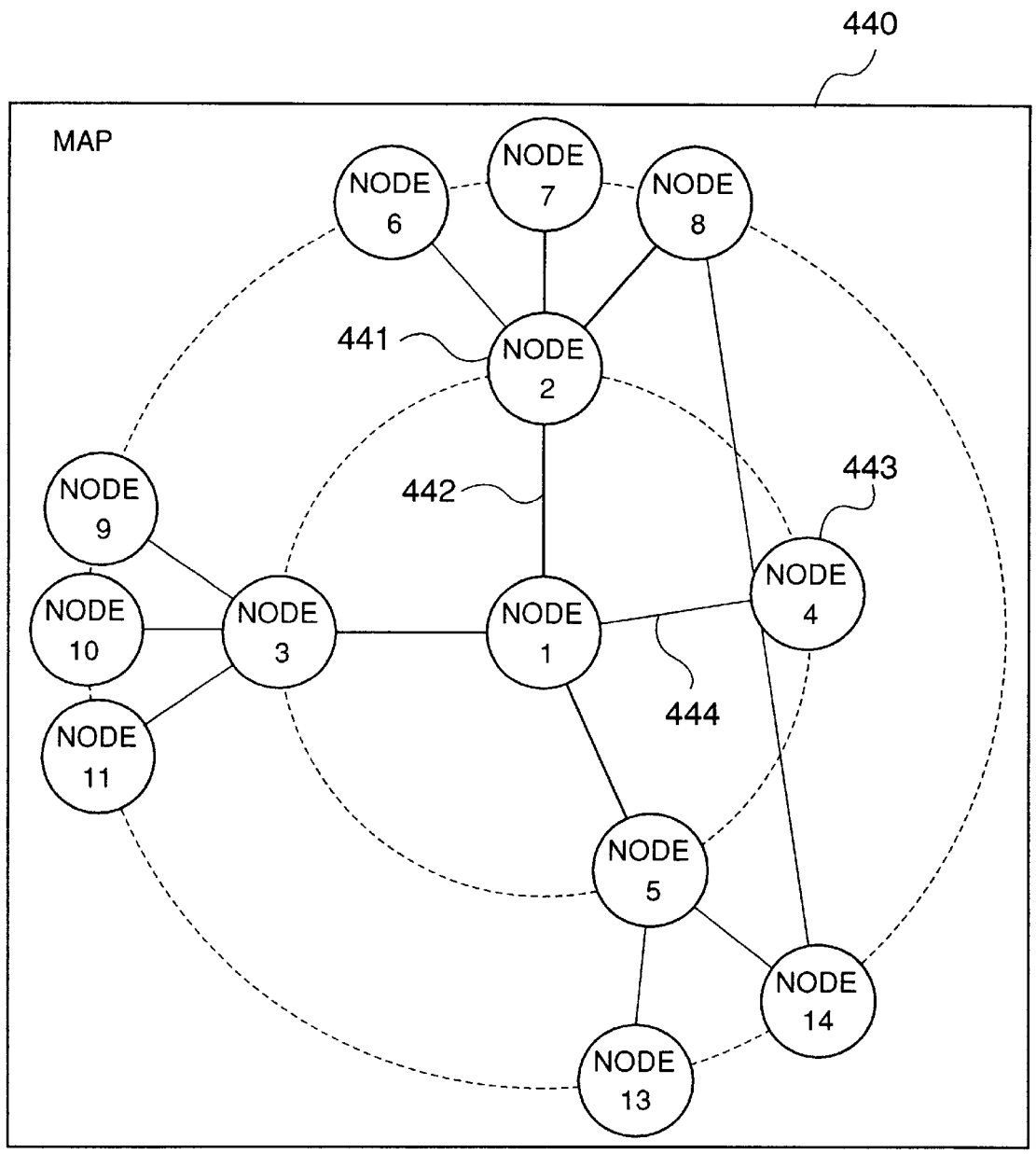
FIG. 9 shows an example of displaying structural information used in a fifth embodiment.

Next, a fifth embodiment according to the present invention is described with reference to FIGS. 9, 10, 11, 12 and 3. The structure of the fifth embodiment is the same as that shown in FIG. 1. FIG. 9 shows an example of a map generated by the structure display means 25 according to the present embodiment. In the map, a node which is viewed now with the browsing unit is in the center, nodes which can be obtained by following a link one time are placed on an innermost circumference, and nodes which can be obtained by following a link two times are placed on the next innermost circumference. In the same way, the farther the circumference on which nodes are placed goes outside, the more links are required to follow from the node which is viewed now to the nodes on the circumference.

Figure 10:
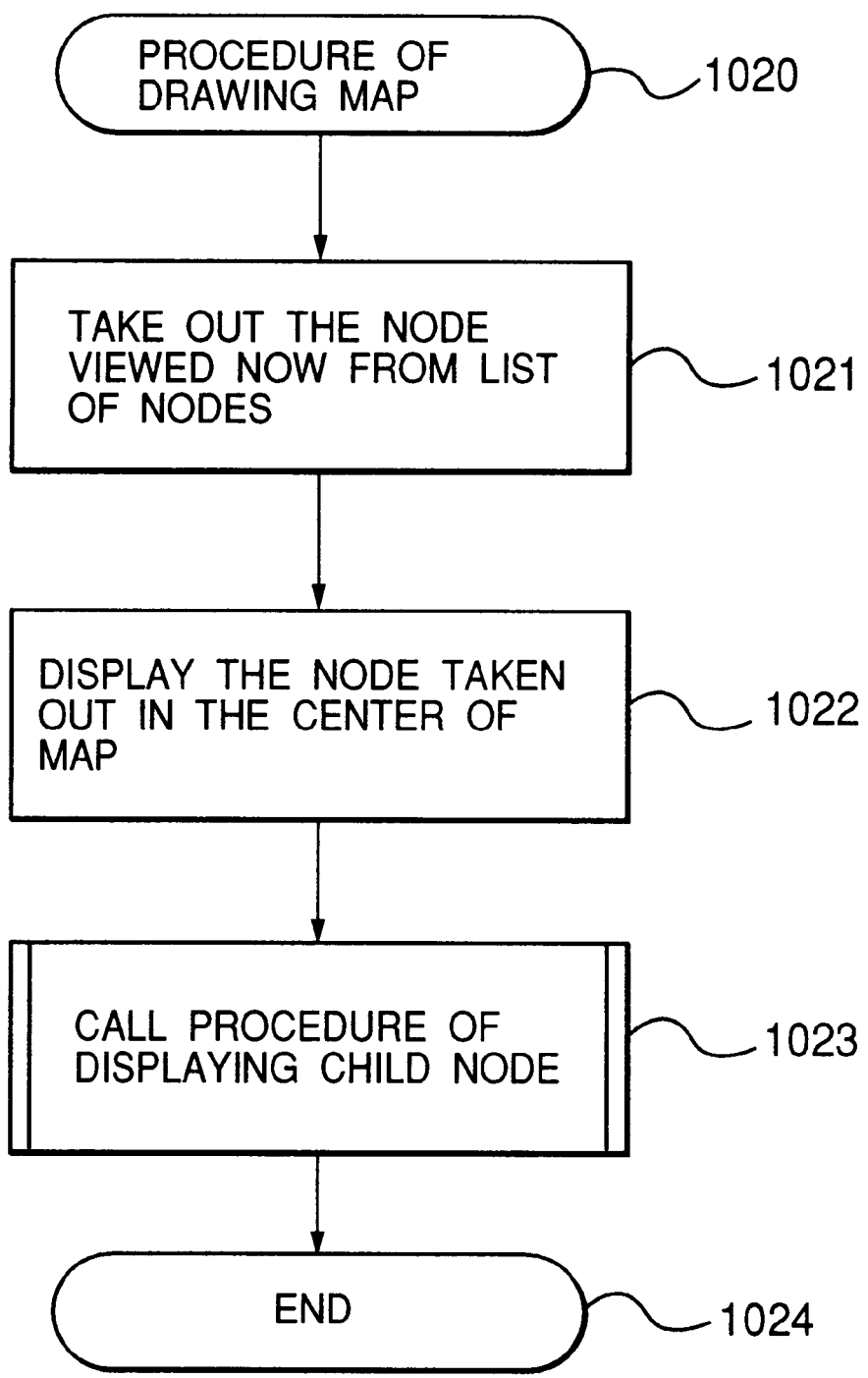
FIG. 10 is a flow diagram showing an example of procedure of displaying the structural information used in the fifth embodiment.
Figure 11:
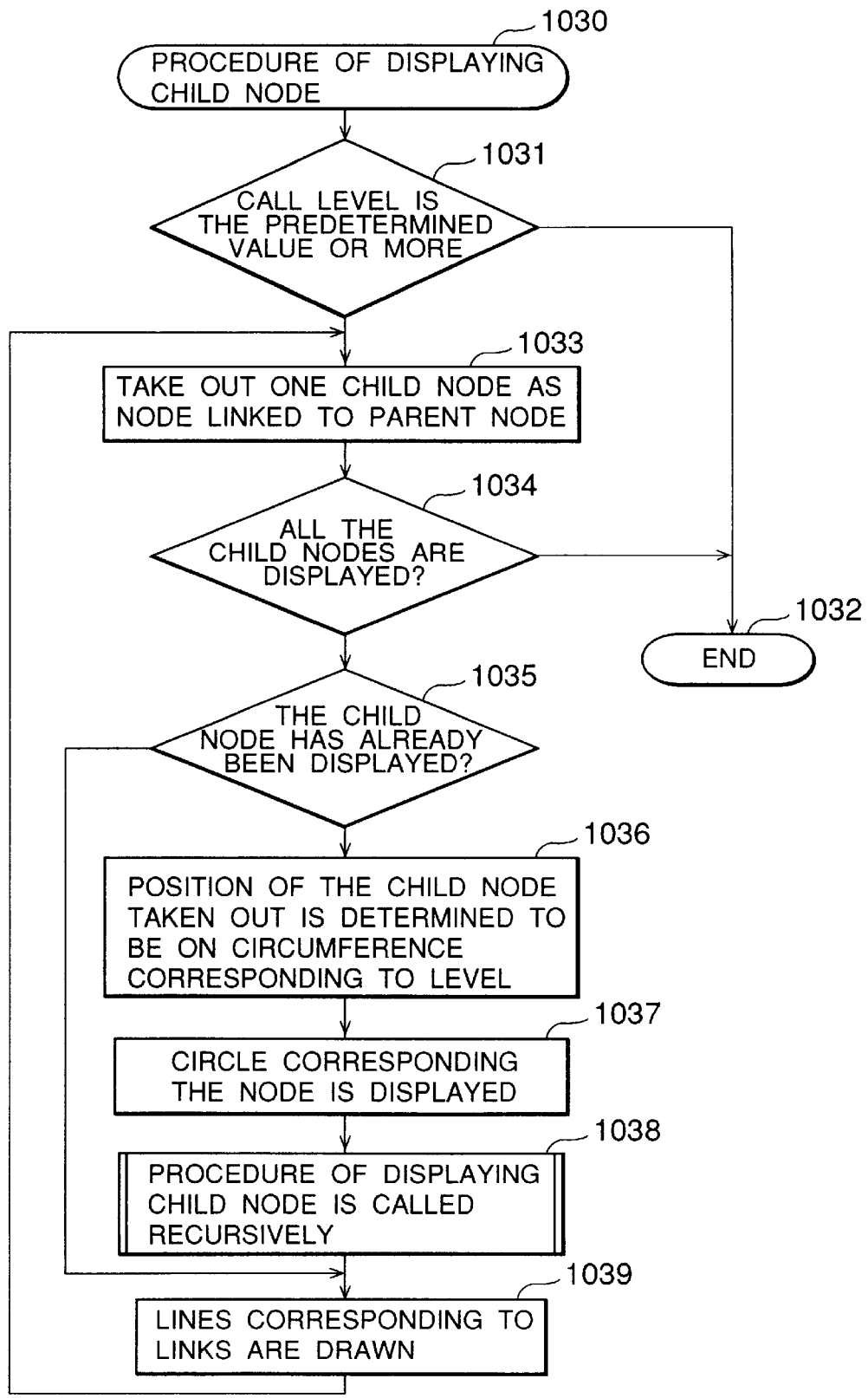
FIG. 11 is a flow diagram showing an example of procedure of displaying the structural information used in the fifth embodiment.

FIGS. 10 and 11 are flow diagrams showing an example of algorithm of procedure of drawing a map by the structure display means 25 according to the fifth embodiment.

The structure display means calls procedure of drawing a map (step 1020). First, with the browsing unit according to the fifth embodiment, an identifier of a node which is viewed now and a list of identifiers of nodes linked to the node which is viewed now are taken out from the structural information 201 (step 1021). A circle representing the node taken out is drawn in the center of the map (step 1022).

The list of the nodes linked to the node drawn in the center and an integer "1" representing call level are passed as arguments of procedure of displaying a child node (step 1030), and the procedure is called (step 1023). Since the procedure of displaying a child node is recursively called, the description is generalized in the following.

In the procedure of displaying a child node, first, it is checked whether the call level given as an argument equals to or more than the range to be displayed (step 1031). In this case, if the range to be displayed is level 2, it is checked whether the call level is 2 or more. The level of the range to be displayed may be set arbitrarily.

If the call level is 2 or more, the procedure ends (step 1032). If not, an identifier of a linked node is taken out in order of the list of linked nodes given as an argument (step 1033). In the following description, a linked node is referred to as a child node, and the original node of the procedure and the node displayed just before the time is referred to as a parent node.

Then, it is ascertained whether reading is done to the end of the list of linked nodes (step 1034). If the reading is done to the end of the list, it follows that all child nodes which belong to the original node are displayed, and the procedure ends (step 1032). If not, it is checked whether the child node corresponding to the linked node identifier taken out has already been displayed (step 1036). If the child node has already been displayed, the process for displaying the descendant node (steps 1036, 1037, and 1038) is skipped.

If the child node has not yet been displayed, the display position of the child node is calculated (step 1036). Here, the position of the child node is calculated not in the (x, y) coordinate system but in an (r, θ) coordinate system wherein r is the distance from the center and θ is the angle. Since a child node is disposed on a circumference corresponding to its call level, r can be found by the following expression:

(call level)×(a predetermined radius)

θ is decided to be in the center of an angle assigned to the child node. In deciding the angle assigned to the child node, an angle assigned to the parent node is used. An assigned angle is given as an argument when the procedure is called.

The angle assigned to the parent node, that is, to the node in the center, in calculating the position of a child node of level 1 is from zero to $2\pi$. The angle assigned to the child node is decided by dividing the angle assigned to the parent node which is given in advance at the time of calling the procedure by the ratios of the child nodes' descendant nodes of the same call level.

Figure 12:
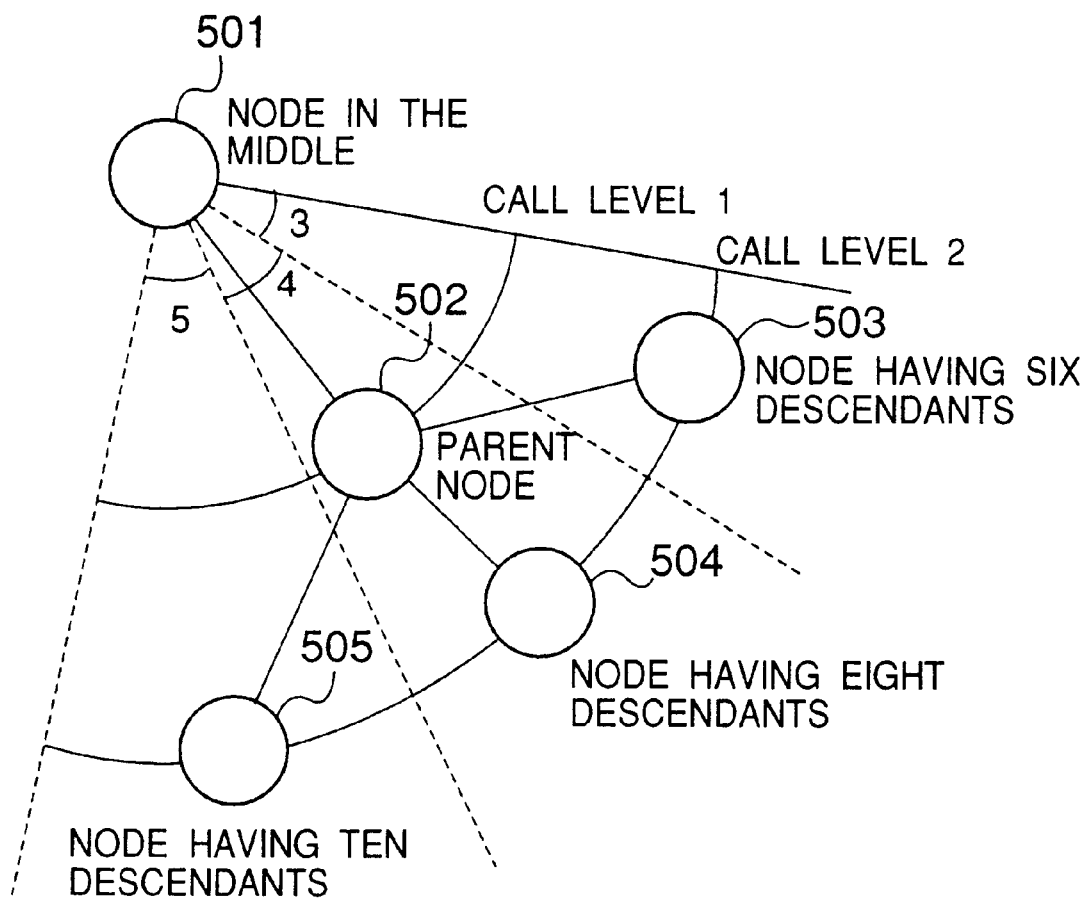
FIG. 12 shows a method for calculating display positions of nodes in the fifth embodiment.

FIG. 12 shows a method of assigning angles. The call level of a parent node 502 is 1, and an angle of 12 units is assigned from a center node 501 to the parent node 502. Three child nodes of the parent node 502 are Nodes 503, 504, and 505 having six, eight, and ten descendants, respectively. Therefore, the 12 units assigned to the parent node are divided in the ratios of three, four, and five so as to correspond to the respective numbers of the descendants.

The pair (r, $\theta$) is decided as mentioned in the above, and then, the pair (r, $\theta$) is transformed to an (x, y) coordinate, and a circle representing the node is displayed (step 1037).

Next, with the child nodes as the parent node, the procedure of displaying a child node is called recursively (step 1038). Here, a call level increased by one, a list of nodes linked to the child node, and the angle assigned to the child node calculated at step 1036 are given as arguments.

After the procedure at step 1038 is finished, lines representing links are drawn between the parent node and the child nodes (step 1039). This is the end of the process for drawing the child nodes taken out at step 1033 and their descendants. Then, the routine repeats to draw the next child node in the list of linked nodes. In this way, all of the nodes and the links are displayed on the map.

Procedure of displaying the map shown in FIG. 9 based on the data shown in FIG. 3 is now described according to the above-mentioned algorithm. First, Node 1 at the head of the list of the original nodes is taken out, and at the same time, the list of linked nodes connected with the entry of Node 1 is taken out (step 1021). A circle representing Node 1 is drawn in the center of the map (step 1022).

Since the call level is still "1", the procedure continues (step 1031). Node 2 is taken from the list of nodes linked to Node 1 (step 1033). Since the number of descendants of Node 2 is four including Node 2 itself, the numbers of descendants of Nodes 3, 4, and 5, which are the other nodes of call level 1, are four, one, and three, respectively, and the angle assigned to the parent node is from zero to $2\pi$ and the angle assigned to Node 2 is $(4/4+1+3)\times(2\pi-0)$. The angle of drawing Node 2 is found by 0+(assigned angle×½), the distance from the center of the map is decided as (call level)×(predetermined value) (step 1036), and a circle representing Node 2 is drawn at that position (step 1037).

In order to draw Nodes 6, 7, and 8, which are child nodes of Node 2, the range of the angle assigned to Node 2 is given as an argument, the call level is made to be 2, and the procedure of displaying a child node is recursively called (step 1038). After the child nodes of Node 2 are drawn, lines representing links are drawn between Node 2 and the respective child nodes (step 1039). In this way, the procedure of drawing descendants of all nodes of call level 1 (the routine goes back to step 1033 and repeats) is finished to obtain the output shown in FIG. 9.

According to the fifth embodiment, by displaying structural information as a circular hierarchical graph, the structure can be displayed with the number of links necessary for navigation from the node which is viewed now to a specific node being easy to understand.

Figure 13:
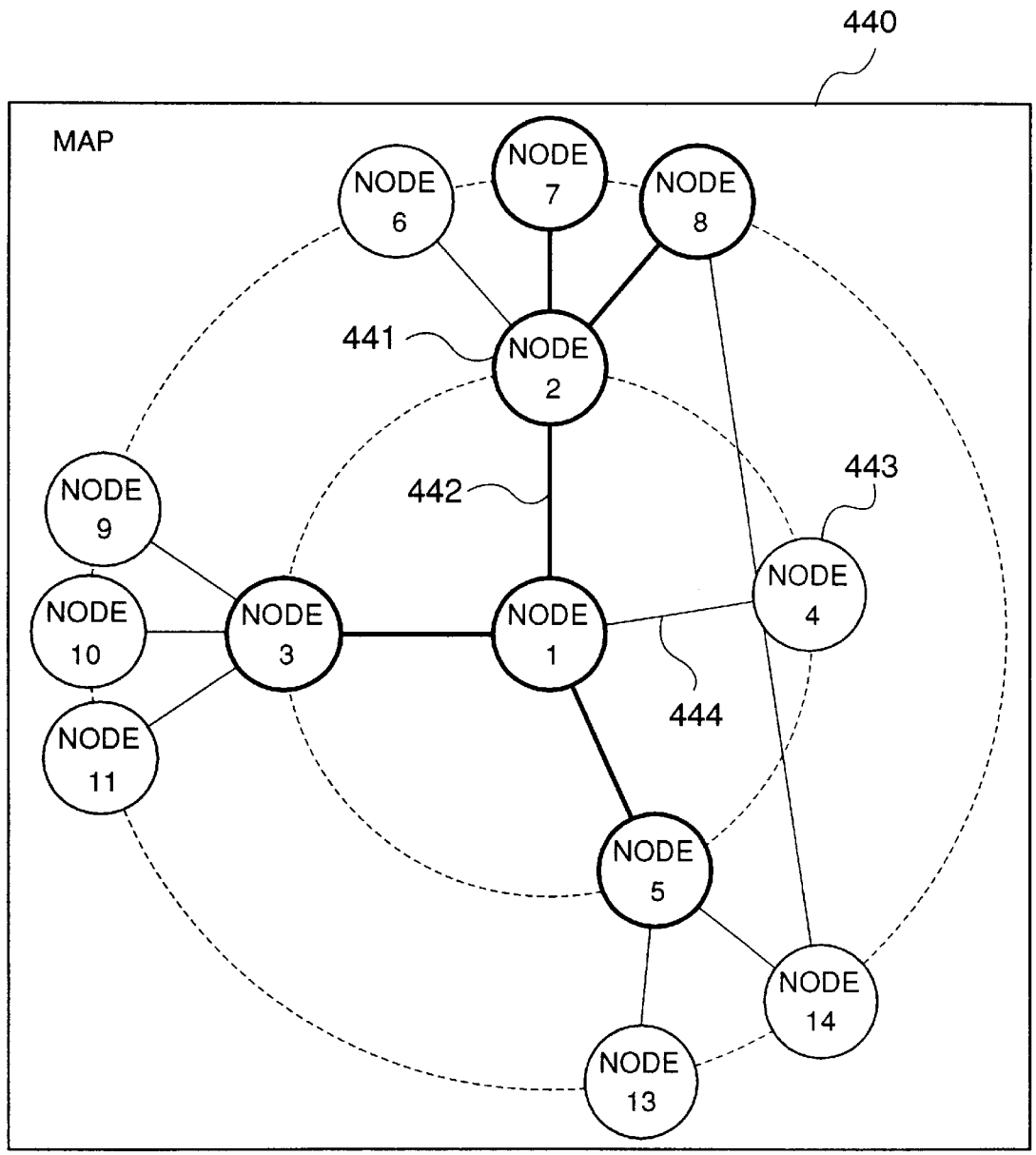
FIG. 13 shows an example of displaying structural information used in a sixth embodiment.

Next, a sixth embodiment according to the present invention is described with reference to FIGS. 13, 10, 11, and 5. The structure of the sixth embodiment is the same as that shown in FIG. 5. FIG. 13 shows an example of a map generated by the structure display means 25 according to the sixth embodiment. Here, a map similar to that according to the third embodiment is displayed, but this embodiment is characterized in that, based on the access history 202 recorded by the access history recording means 26 according to the second embodiment, the way of displaying is changed depending on the frequency of access to the respective nodes and links.

Here, it is represented that the thicker the drawn line is, the higher the frequency of access is. What represents the difference of the frequency of access is not limited to the thickness of lines, and, for example, the difference in the frequency of access may also be represented by difference in color.

An example of the procedure of drawing a map by the structure display means 25 according to the sixth embodiment is similar to that shown in FIGS. 10 and 11, except that the frequency of access to the nodes and the links to be drawn when the nodes and the links are displayed (steps 1037 and 1039) is obtained from the historical information, and, the way of displaying is changed so that, if the frequency of access to a node or a link is less than ten times, from ten to twenty times, from twenty to forty times, and forty times or more, the thickness of a line used in drawing the node or the link is "1", "2", "3", and "4", respectively.

FIG. 13 reflects the values of the frequency of access in FIG. 5. For example, Node 2 (441), the frequency of access to which is 58 times, and a link (442) from Node 1 to Node 2, the frequency of access to which is 44 times, are drawn with the line which is "4" thick. On the other hand, Node 4 (443), the frequency of access to which is three times, and a link (444) from Node 1 to Node 4, the frequency of access to which is three times, are drawn with the line which is "1" thick.

According to the sixth embodiment, by highlighting the frequency of access to nodes and links on a circular hierarchical graph, the structure and the access history can be displayed so as to be easily understood.

Next, a seventh embodiment according to the present invention is described with reference to FIGS. 14, 15, 16, and 3. The structure of the seventh embodiment is the same as that shown in FIG. 3.

Figure 14:
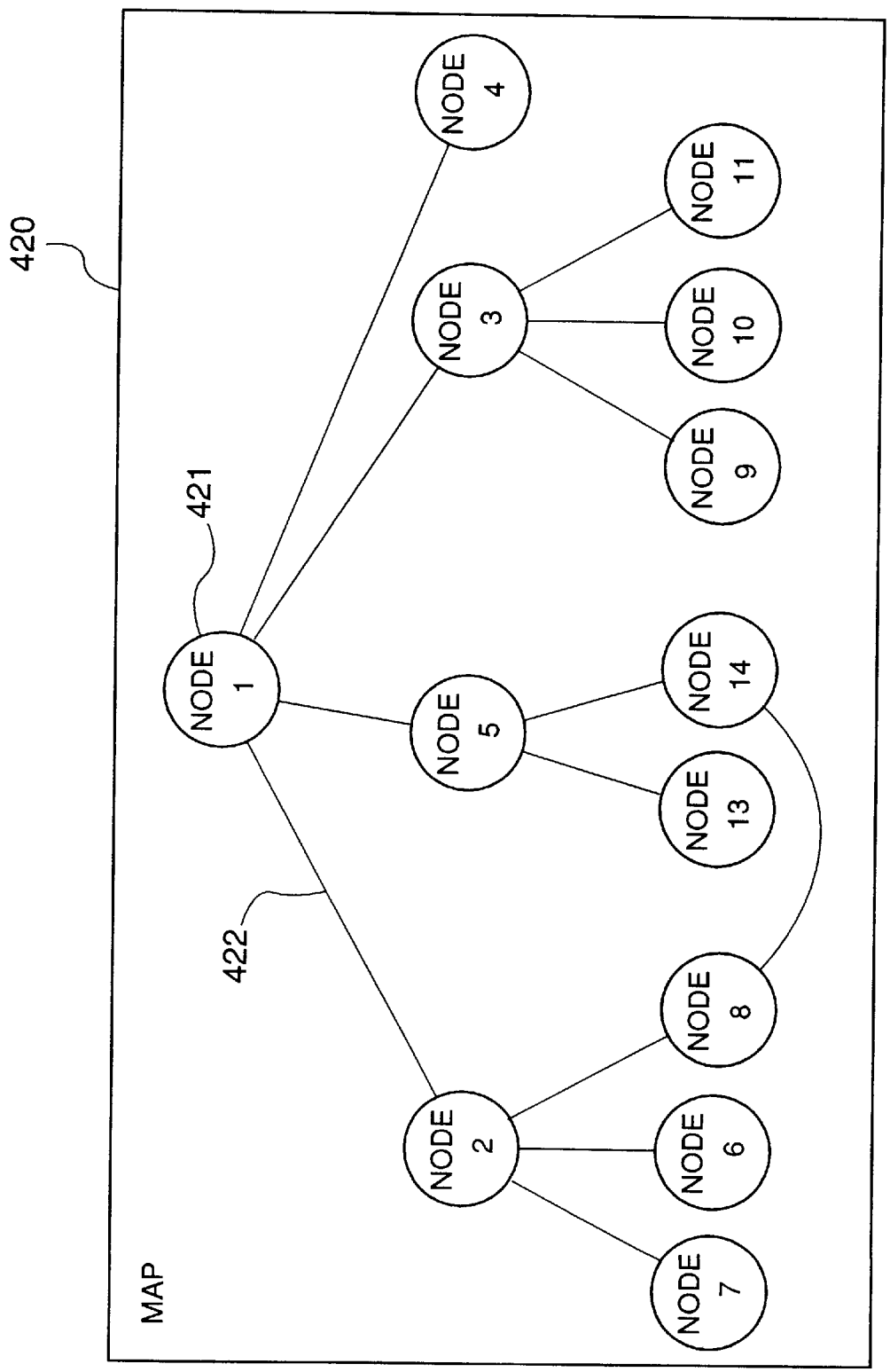
FIG. 14 shows an example of displaying structural information used in a seventh embodiment.

FIG. 14 shows an example of a map generated by the structure display means 25 according to the seventh embodiment. The map displays to a user structural information in the form of tree structure with a node which is viewed now with the browsing unit being as a root. Further, depending on the relationship between nodes managed by the servers, there may be a blind way.

Figure 15:
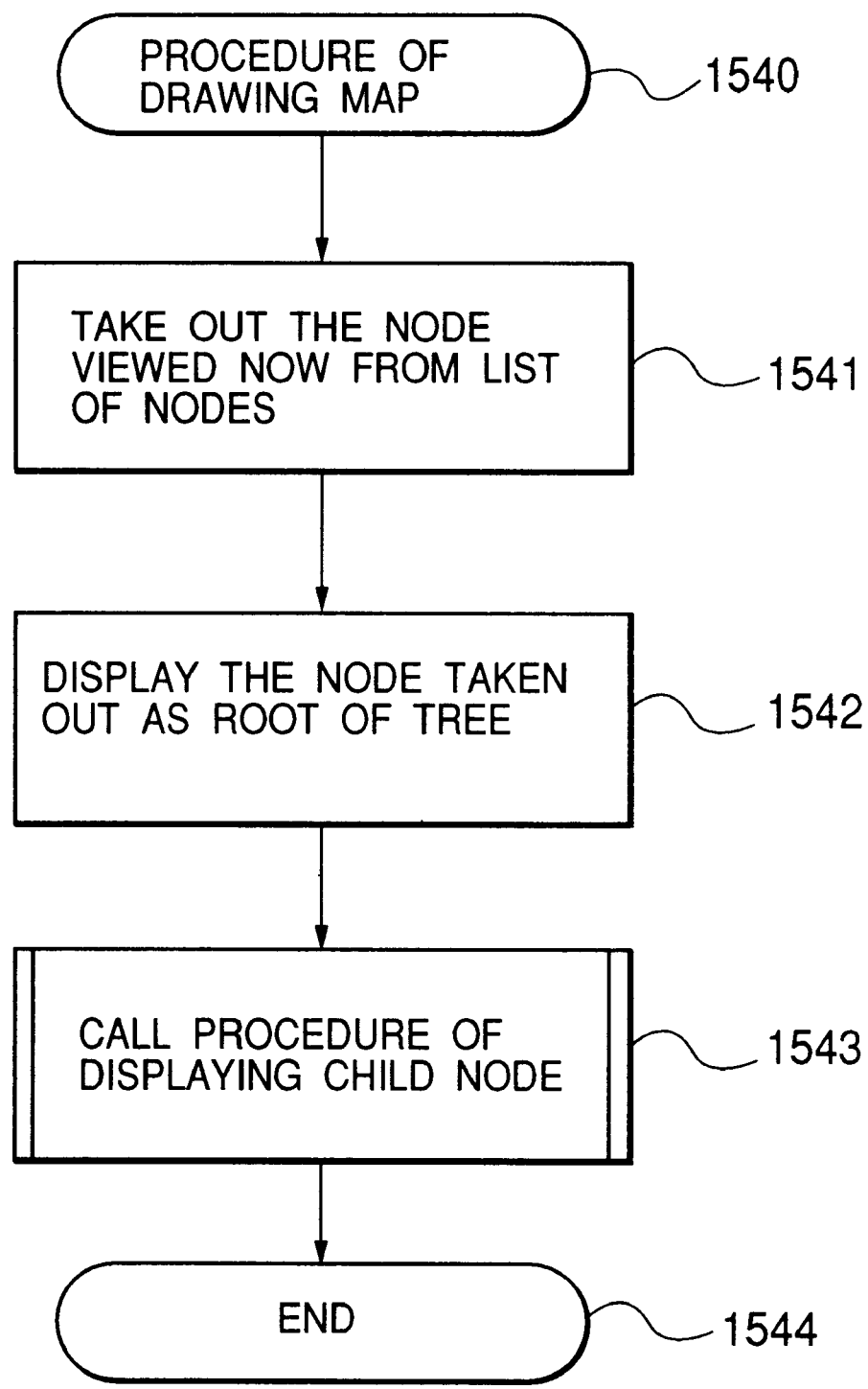
FIG. 15 is a flow diagram showing an example of procedure of displaying the structural information used in the seventh embodiment.
Figure 16:
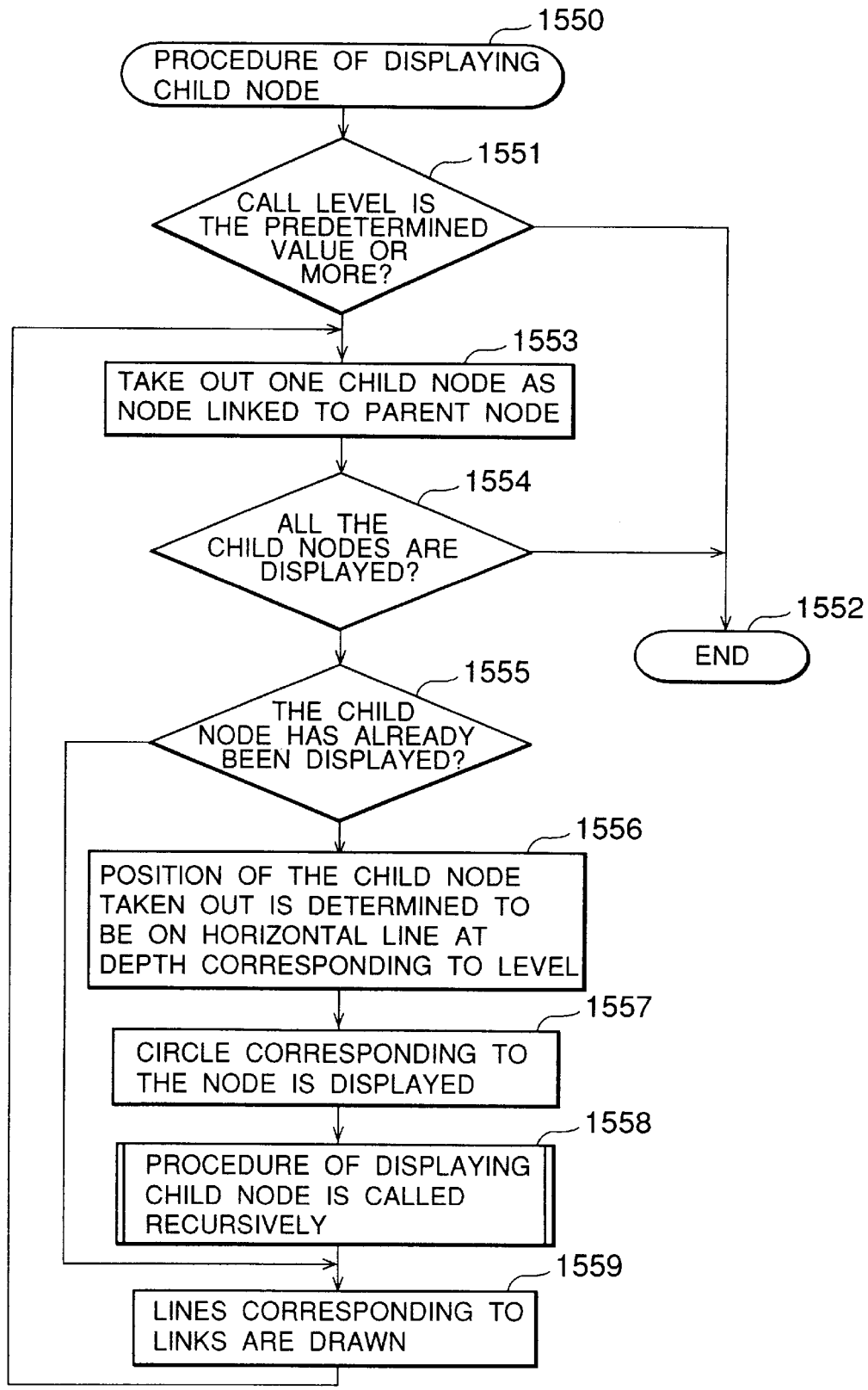
FIG. 16 is a flow diagram showing an example of procedure of displaying the structural information used in the seventh embodiment.

FIGS. 15 and 16 are flow diagrams showing an example of algorithm of procedure of drawing a map by the structure display means 25 according to the seventh embodiment.

The structure display means 25 calls procedure of drawing a map (step 1540). Then, first, an identifier of a node which is viewed now with the browsing unit, and a list of identifiers of nodes linked to the node which is viewed now are taken out from the structural information (step 1541). A circle representing the node taken out is drawn as a root of a tree to be displayed on the map (step 1542).

The list of the nodes linked to the node drawn as a root and an integer "1" representing call level are passed as arguments of procedure of displaying a child node (step 1550), and the procedure is called (step 1543). Since the procedure of displaying a child node is recursively called, the description is generalized in the following.

In the procedure of displaying a child node, first, it is checked whether the call level given as an argument equals to or more than the range to be displayed (step 1551). For example, if the range to be displayed is level 2, it is checked whether the call level is 2 or more.

If the call level is 2 or more, the procedure ends (step 1552). If not, an identifier of a linked node is taken out in order of the list of linked nodes given as an argument (step 1553). In the following description, a linked node is referred to as a child node, and the original node of the procedure and the node displayed just before the time is referred to as a parent node.

Then, it is ascertained whether reading is done to the end of the list of linked nodes (step 1554). If the reading is done to the end of the list, it follows that all child nodes which belong to the original node are displayed, and the procedure ends (step 1552). If not, it is checked whether the child node corresponding to the linked node identifier taken out has already been displayed (step 1555). If the child node has already been displayed, the process for displaying the descendant node (steps 1556, 1557, and 1558) is skipped.

If the child node has not yet been displayed, the display position of the child node is calculated according to the following procedure(step 1556).

Figure 17:
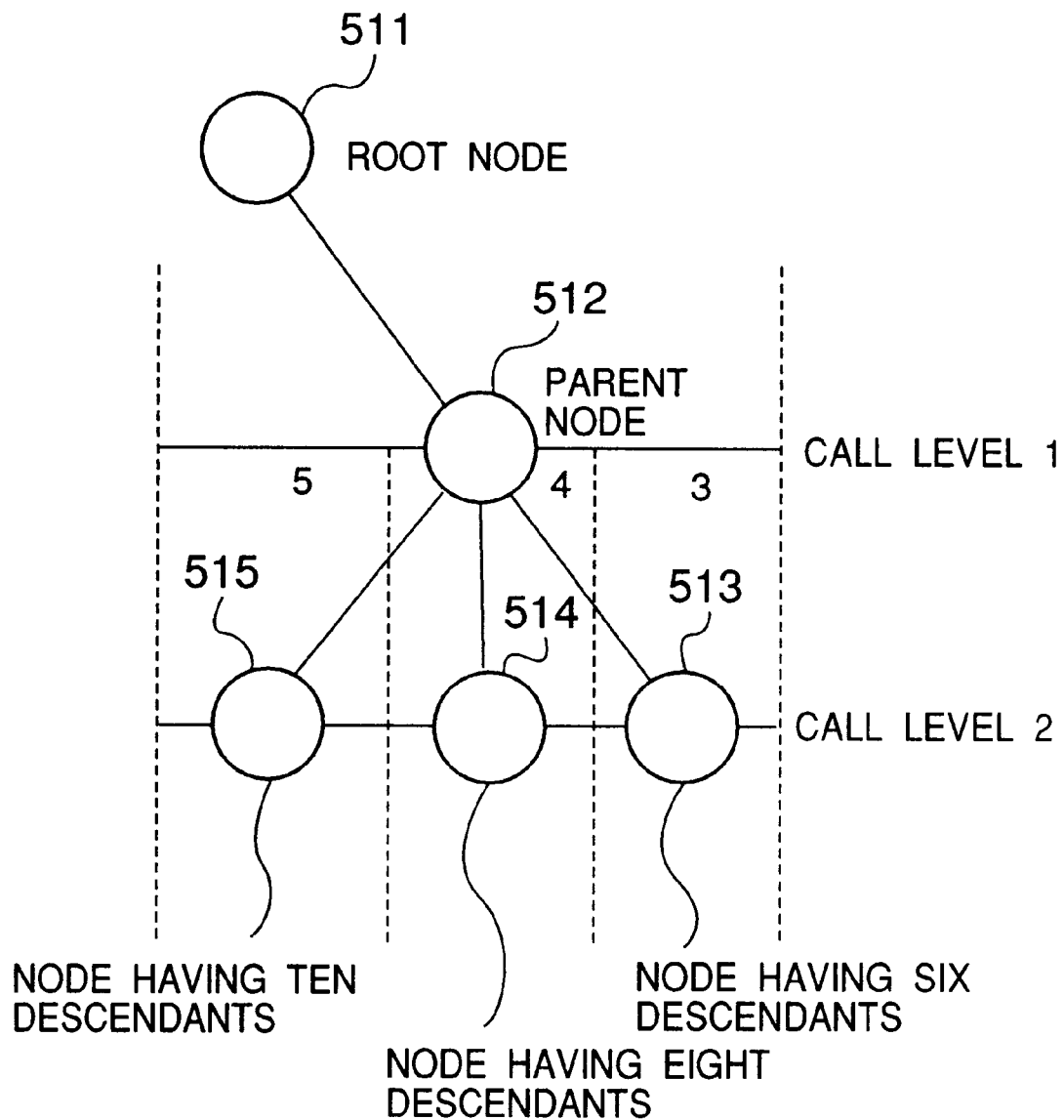
FIG. 17 shows a method for calculating display positions of nodes in the seventh embodiment.

FIG. 17 is an example of algorithm in deciding the display position of a node. A child node is disposed on a horizontal line at a depth corresponding to the call level. The y-coordinate can be found by the following expression:

(call level)×(height per one level)

The x-coordinate is decided to be in the middle of a width assigned to the child node. In deciding the width assigned to the child node, a width assigned to the parent node is used. An assigned width is given as an argument when the procedure is called. The width assigned to the parent node, that is, to the root node, in calculating the position of a child node of level 1 is the width of the display region of the whole map.

In FIG. 17, the call level of a parent node 512 is 1, and a width of 12 units is assigned from a center node 511 to the parent node 512. Three child nodes of the parent node 512 are Nodes 513, 514, and 515 having six, eight, and ten descendants, respectively. Therefore, the 12 units of width assigned to the parent node are divided in the ratios of three, four, and five so as to correspond to the respective numbers of the descendants. The display position of a child node is decided to be in the middle of the assigned width.

A circle representing the node is displayed at a position decided as mentioned in the above (step 1557). With the child nodes as the parent node, the procedure of displaying a child node is called recursively (step 1558). Here, a call level increased by one, a list of nodes linked to the child node, and the width assigned to the child node calculated at step 1556 are given as arguments.

After the procedure at step 1558 is finished, lines representing links are drawn between the parent node and the child nodes (step 1559). This is the end of the process for drawing the child nodes taken out at step 1553 and their descendants. Then, the routine repeats to draw the next child node in the list of linked nodes. In this way, all of the nodes and the links are displayed on the map.

Procedure of displaying the map shown in FIG. 14 based on the data shown in FIG. 3 is now described according to the above-mentioned algorithm.

First, Node 1 at the head of the list of the original nodes is taken out, and at the same time, the list of linked nodes connected to the entry of Node 1 is taken out (step 1541). A circle representing Node 1 is drawn in the upper center of the map as a root of tree structure (step 1542). The procedure of displaying a child node is called with the call level being 1 (step 1543).

Since the call level is still "1", the procedure continues (step 1551). Node 2 is taken from the list of nodes linked to Node 1 (step 1553). Since the number of descendants of Node 2 is four including Node 2 itself and the numbers of descendants of Nodes 3, 4, and 5, which are the other nodes of call level 1, are four, one, and three, respectively, the width assigned to Node 2 is (4/4+1+3)×(the width of the display region of the map).

The x-coordinate of the position of drawing Node 2 is the middle point of the assigned width calculated in the above, and the y-coordinate of the position of drawing Node 2 is decided to be (call level)×(predetermined value) from the y-coordinate of Node 1 (step 1556), and a circle representing Node 2 is drawn there (step 1557).

In order to draw Nodes 6, 7, and 8, which are child nodes of Node 2, the range of the angle assigned to Node 2 is given as an argument, the call level is made to be 2, and the procedure of displaying a child node is recursively called (step 1558).

After the child nodes of Node 2 are drawn, lines representing links are drawn between Node 2 and the respective child nodes (step 1559). In this way, the procedure of drawing descendants of all nodes of call level 1 (the routine goes back to step 1553 and repeats) is finished to obtain the output shown in FIG. 14.

According to the seventh embodiment, by displaying structural information as a graph in the form of tree structure, the structure can be displayed in the form of a tree with the node viewed now as a root.

Next, an eighth embodiment according to the present invention is described with reference to FIGS. 18, 15, 16, and 5. The structure of the eighth embodiment is the same as that shown in FIG. 5.

Figure 18:
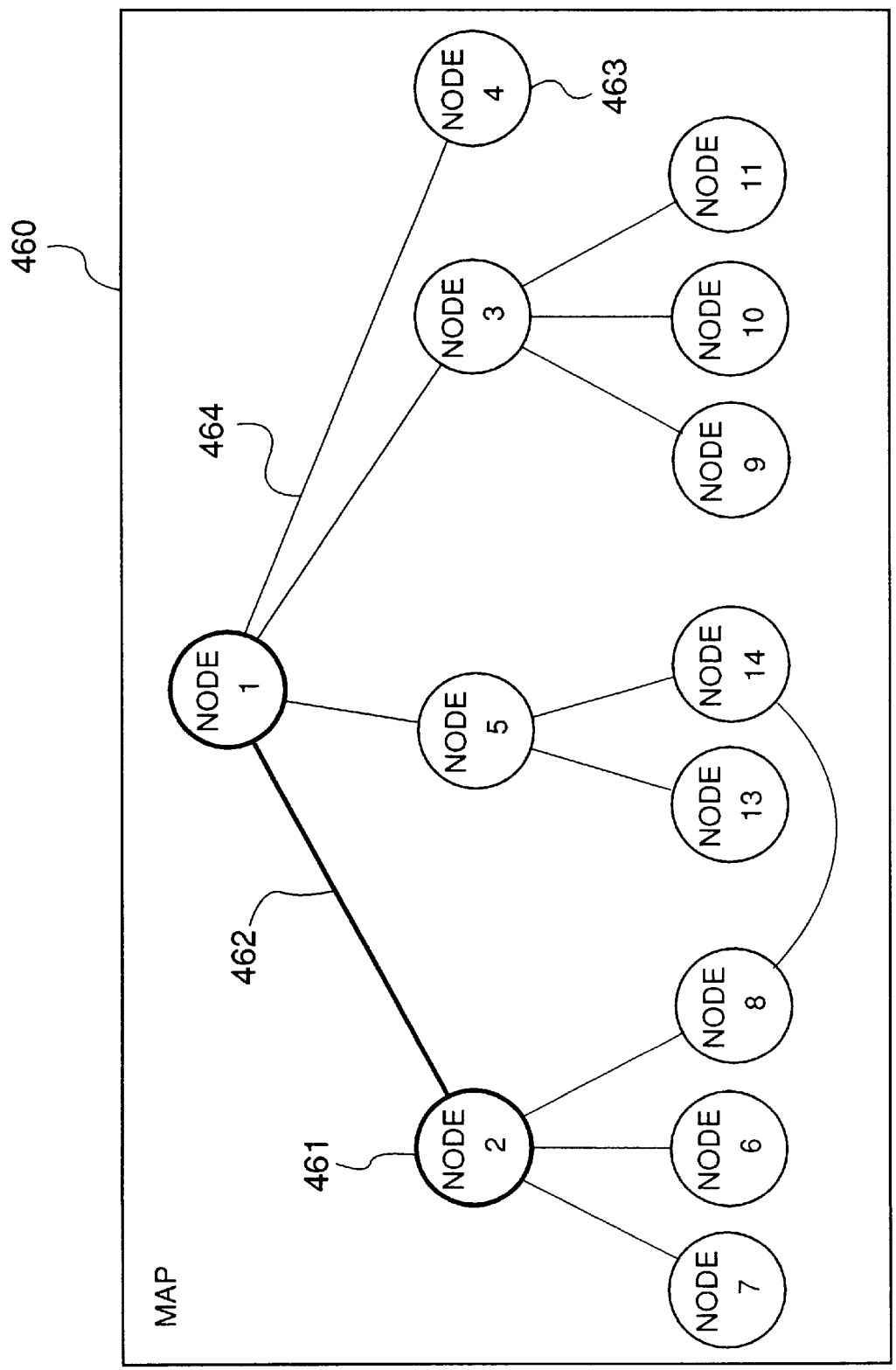
FIG. 18 shows an example of displaying structural information used in an eighth embodiment.

FIG. 18 shows an example of a map generated by the structure display means according to the eighth embodiment. Here, a map similar to that according to the seventh embodiment is displayed, but in this embodiment, based on the access history 202 recorded by the access history recording means 26 according to the second embodiment, the way of displaying is changed depending on the frequency of access to the respective nodes and links. Here, it is represented that the thicker the drawn line is, the higher the frequency of access is. What represents the difference of the frequency of access is not limited to the thickness of lines, and, for example, the difference in the frequency of access may also be represented by difference in color.

An example of the procedure of drawing a map according to the eighth embodiment is similar to that shown in FIGS. 15 and 16, except that the frequency of access to the nodes and the links when the nodes and the links are displayed (steps 1557 and 1559) is obtained from the historical information, and, the way of displaying is changed so that, if the frequency of access to a node or a link is less than ten times, from ten to twenty times, from twenty to forty times, and forty times or more, the thickness of a line used in drawing the node or the link is "1", "2", "3", and "4", respectively.

The frequency of access shown in FIG. 18 reflects the values shown in FIG. 5. For example, Node 2 (461), the frequency of access to which is 58 times, and a link (462) from Node 1 to Node 2, the frequency of access to which is 44 times, are drawn with the line which is "4" thick. On the other hand, Node 4 (463), the frequency of access to which is three times, and a link (464) from Node 1 to Node 4, the frequency of access to which is three times, are drawn with the line which is "1" thick.

According to the eighth embodiment, by highlighting the frequency of access to nodes and links on a graph in the form of a tree, the structure and the access history can be displayed so as to be easily understood.

Next, a ninth embodiment according to the present invention is described with reference to FIGS. 19, 10, 11, 12, and 5. The structure of the ninth embodiment is the same as that shown in FIG. 5.

Figure 19:
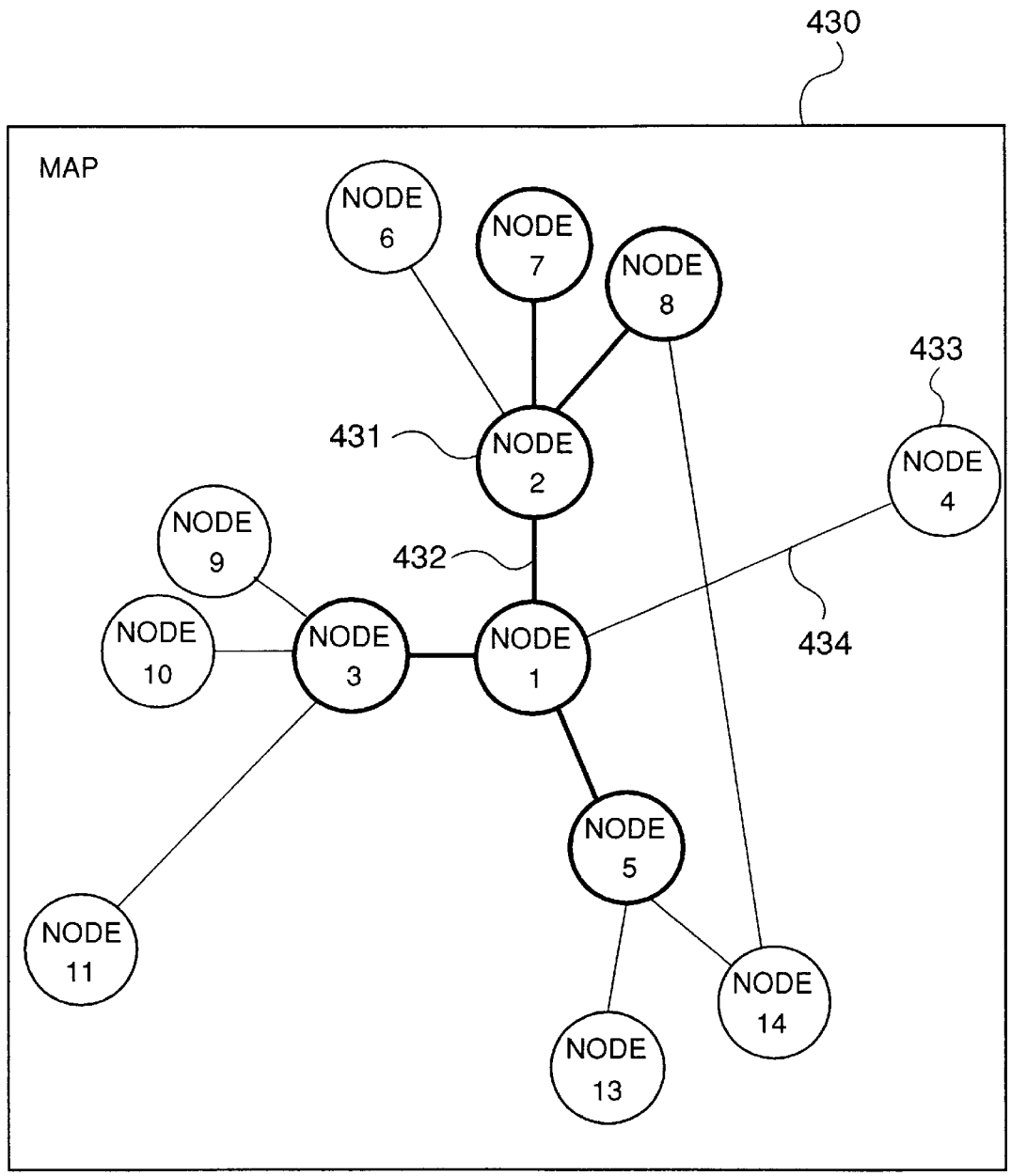
FIG. 19 shows an example of displaying structural information used in an ninth embodiment.
Figure 20:
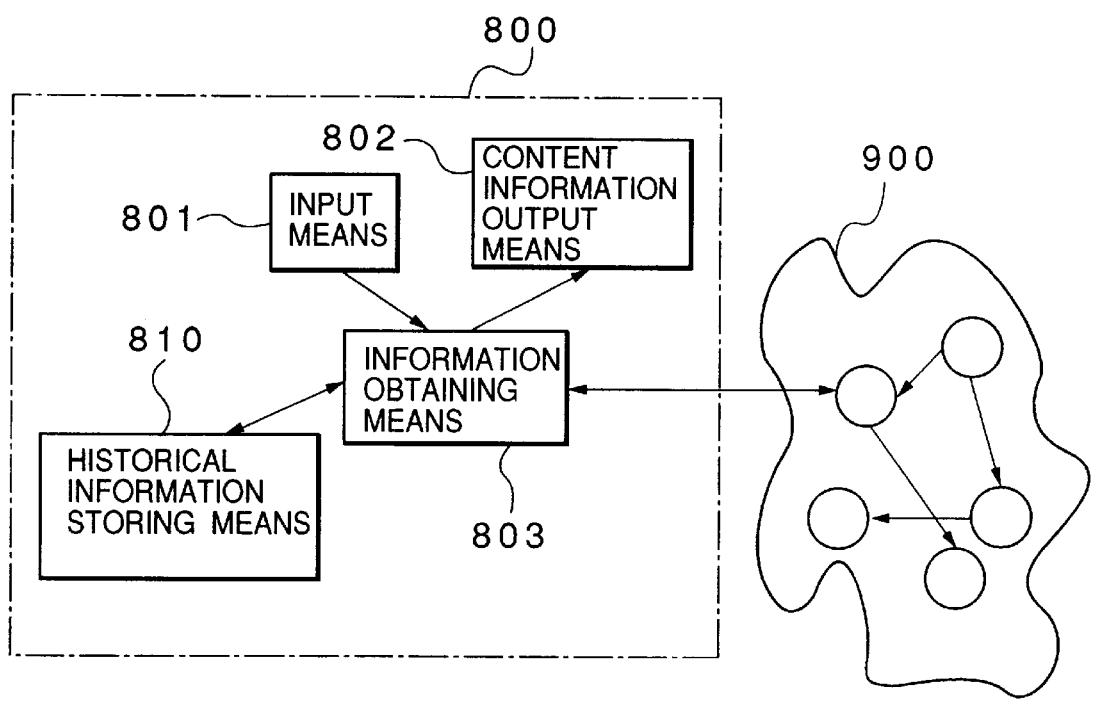
FIG. 20 is a block diagram showing an example of structure of a conventional browsing unit.

FIG. 19 shows an example of a map generated by the structure display means 25 according to the ninth embodiment. The example of procedure of drawing a map according to the ninth embodiment is similar to that shown in FIGS. 10 and 11, but the way of calculating the display position of nodes and the way of displaying the nodes are different.

When the position of the child node is calculated (step 1036), it is calculated not in the (x, y) coordinate system but in an (r, θ) coordinate system wherein r is the distance from the center and θ is the angle.

Since a child node is disposed on a circumference corresponding to the frequency of access to it taken out from the historical information, r can be found by the following expression:

(level value of the frequency of access)×(a predetermined radius)

Here, the level value of the frequency of access is "1", "2", "3", and "4" if the frequency of access to a child node is forty times or more, from 20 to forty times, from ten to twenty times, and less than ten times, respectively. θ is decided to be in the center of an angle assigned to the child node. In deciding the angle assigned to the child node, an angle assigned to the parent node is used. An assigned angle is given as an argument when the procedure is called. The angle assigned to the parent node, that is, to the node in the middle, in calculating the position of a child node of level 1 is from zero to 2π.

The angle assigned to the child node is decided by dividing the angle assigned to the parent node which is given in advance at the time of calling the procedure by the ratios of the child nodes' descendant nodes of the same call level.

FIG. 12 shows a method of assigning angles. The call level of a parent node 502 is 1, and an angle of 12 units is assigned from a center node 501 to the parent node 502. Three child nodes of the parent node 502 are Nodes 503, 504, and 505 having six, eight, and ten descendants, respectively. Therefore, the 12 units assigned to the parent node are divided in the ratio of three, four, and five.

In displaying (steps 1037 and 1039), the frequency of access to the nodes and the links to be drawn is obtained from the historical information, and, the way of displaying is changed so that, if the frequency of access to a node or a link is less than ten times, from ten to twenty times, from twenty to forty times, and forty times or more, the thickness of a line used in drawing the node or the link is "1", "2", "3", and "4", respectively.

In the example shown in FIG. 5, the level value of Node 2 (431), the frequency of access to which is 58 times, is "1", and the level value of Node 4 (433), the frequency of access to which is three times, is "4". Since the distance from the center to a node to be drawn can be found by (level value of the frequency of access)×(a predetermined radius), as shown in FIG. 19, even though Nodes 2 and 4 are of the same call level, Node 2 the frequency of access to which is high is disposed near the middle, while, on the other hand, Node 4 the frequency of access to which is low is disposed farther from the middle.

According to the ninth embodiment, by highlighting the frequency of access to nodes and links on a circular hierarchical graph, and by changing the distance from the center node to the nodes and links according to the frequency of access thereto, the structure and the access history can be displayed so as to be easily understood.

As described in the above, according to a browsing unit of the present invention, a user can easily understand the macro structure of a distributed hyper media space, and in addition, an access history is displayed to the user, and thereby, efficient navigation is allowed with the state of access by the user himself (or herself) in the past taken into consideration.

These allow seeing far ahead in navigation through a distributed hyper media space, and quick access to necessary information.

A macro structure of a distributed hyper media space, which was conventionally difficult to understand because of the distributed management thereof, can be displayed to a user. While it costs much to collect in advance from many servers structural information of a hyper media space possessed by the servers, according to the present embodiment, by extracting structural information as a history from content information of a node obtained by the user himself (or herself), a macro structure can be obtained at a very low cost. Further, according to the present invention, there are effects described in the following.

Information about the frequency of access, time spent in reading, and so on is recorded as the history of access by the user, while conventionally, only the date and time of the last access are taken into consideration. Thus, information which can be displayed to the user is increased, navigation with the access in the past by the user himself (or herself) as the key is allowed, and wasteful operation can be reduced.

The structure of the nodes and the links is easy to understand by displaying structural information as a simple graph. By highlighting nodes and links depending on the frequency of access thereto on a map of a graph structure, the structure and the access history can be displayed so as to be easily understood.

In addition, by displaying structural information as a circular hierarchical graph, the structure can be displayed with the number of links necessary for navigation from the node which is viewed now to a specific node being easy to understand. By highlighting the frequency of access to nodes and links on a circular hierarchical graph, the structure and the access history can be displayed so as to be easily understood. By displaying structural information as a graph in the form of tree structure, the structure can be displayed in the form of a tree with the node viewed now as a root.

Further, by highlighting the frequency of access to nodes and links on a graph in the form of a tree, the structure and the access history can be displayed so as to be easily understood. By highlighting the frequency of access to nodes and links on a circular hierarchical graph, and by changing the distance from the center node to the nodes and links according to the frequency of access thereto, the structure and the access history can be displayed so as to be easily understood.

What is claimed is:

1. A browsing unit used in a distributed hyper media system including a server computer for managing a node, which is a unit of data, and a link representing the relationship between nodes and a client computer for obtaining and displaying information containing said node and said link, comprising:

input means for receiving a request from a user;
   information obtaining means for obtaining a specific node, which the user requests to access, via a network from said server;

content information output means for outputting content information of said specific node to said user;

related information extracting means for extracting link information representing all links from said specific node to other nodes, from said content information of said specific node as structural information;

historical information storing means for storing and managing said structural information extracted by said related information extracting means; and structure display means for displaying said structural information stored in said historical information storing means.

2. The browsing unit claimed in claim 1, further comprising:

access history recording means for recording access historical information with respect to access to said node and said link, wherein said historical information storing means stores said access historical information together with said structural information, and said structure display means displays said structure information and said access historical information at the same time.

3. The browsing unit claimed in claim 1, wherein said structure display means displays said structural information to said user in the form of a graph.

4. The browsing unit claimed in claim 2, wherein said structure display means displays said structural information to said user in the form of a graph, and highlights a part of said graph according to frequency of access.

5. The browsing unit claimed in claim 1, wherein said structure display means displays said structural information to said user in the form of a circular hierarchical graph.

6. The browsing unit claimed in claim 2, wherein said structure display means displays said structural information to said user in the form of a circular hierarchical graph, and highlights a part of said graph according to the frequency of access.

7. The browsing unit claimed in claim 1, wherein said structure display means displays said structural information to said user in the form of a graph of tree structure.

8. The browsing unit claimed in claim 2, wherein said structure display means displays said structural information to said user in the form of a graph of tree structure, and highlights a part of said graph according to the frequency of access.

9. The browsing unit claimed in claim 2, wherein said structure display means displays said structural information to said user in the form of a graph, and displays said graph with the distance between elements of said graph changed according to the frequency of access.

10. A storage medium recording thereon a program for enabling a client computer to execute:

information obtaining processing for obtaining a specific node via a network from a server computer managing said specific node, which is a unit of data, and a link representing the relationship between nodes;

content information output processing for outputting the content of said specific node to a user as structural information;

related information extracting processing for extracting link information representing all links from said specific node to other nodes, from said content information of said specific node as structural information;

historical information storing processing for storing in said storing means, and managing, said structural information extracted by said related information extracting processing; and structure display processing for displaying said structural information stored in said storing means by said historical information storing processing.

11. The storage medium claimed in claim 10, wherein said program further makes said client computer to execute access history recording processing for recording access historical information with respect to access to said node and said link, said historical information storing processing stores said access historical information together with said structural information, and said structure displaying processing displays said structure information and said access historical information at the same time.

12. The storage medium claimed in claim 10, wherein said structure display processing displays said structural information to said user in the form of a graph.

13. The storage medium claimed in claim 11, wherein said structure display processing displays said structural information to said user in the form of a graph, and highlights a part of said graph according to the frequency of access.

14. The storage medium claimed in claim 10, wherein said structure display processing displays said structural information to said user in the form of a circular hierarchical graph.

15. The storage medium claimed in claim 11, wherein said structure display processing displays said structural information to said user in the form of a circular hierarchical graph, and highlights a part of said graph according to the frequency of access.

16. The storage medium claimed in claim 10, wherein said structure display processing displays said structural information to said user in the form of a graph of tree structure.

17. The storage medium claimed in claim 11, wherein said structure display processing displays said structural information to said user in the form of a graph of tree structure, and highlights a part of said graph according to the frequency of access.

18. The storage medium claimed in claim 11, wherein said structure display processing displays said structural information to said user in the form of a graph, and displays said graph with the distance between elements of said graph changed according to the frequency of access.

* * * * *